US010658001B1

(12) United States Patent
Altknecht et al.

(10) Patent No.: US 10,658,001 B1
(45) Date of Patent: *May 19, 2020

(54) METHOD AND SYSTEM FOR SELECTING AND MOVING A SINGLE DISC IN AN OPTICAL DISC LIBRARY

(71) Applicant: International Business Machines Corporation, Armonk, NY (US)

(72) Inventors: David J. Altknecht, San Jose, CA (US); John S. Best, San Jose, CA (US); Donald S. Bethune, San Jose, CA (US); William M. Dyer, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/588,912

(22) Filed: Sep. 30, 2019

Related U.S. Application Data

(63) Continuation of application No. 16/266,898, filed on Feb. 4, 2019.

(51) Int. Cl.
  *G11B 17/038* (2006.01)
  *G11B 17/08* (2006.01)
  (Continued)

(52) U.S. Cl.
  CPC ............ *G11B 17/038* (2013.01); *G11B 17/08* (2013.01); *G11B 17/225* (2013.01); *G11B 23/0325* (2013.01); *G11B 2220/2537* (2013.01)

(58) Field of Classification Search
  CPC ... G11B 17/028; G11B 23/0323; G11B 17/28; G11B 15/6825; G11B 33/0461;
  (Continued)

(56) References Cited

U.S. PATENT DOCUMENTS 5,067,116 A * 11/1991 Kadrmas ................ G11B 17/24
  369/30.77
5,123,000 A    6/1992 Fitzgerald
  (Continued)

FOREIGN PATENT DOCUMENTS

DE       60336579       5/2011
JP    2015176613 A      10/2015

OTHER PUBLICATIONS

Dang, C.H., "Multiple Drives Concept for Top Loading Optical Library," IBM Technical Disclosure Bulletin, Jul. 1995, pp. 361-362, vol. 38, No. 7, IPCOM000115989D, IP.com, United States.
  (Continued)

*Primary Examiner* — Brian E Miller
(74) *Attorney, Agent, or Firm* — Sherman IP LLP; Kenneth L. Sherman; Hemavathy Perumal

(57) ABSTRACT

One embodiment provides a system comprising a motor and a disc selector mechanism. The disc selector mechanism is coupled to a bottom of a guide cage and maintained in a space below the cage. The disc selector mechanism comprises a shaft, transmission components, and a slide assembly that is laterally slidable along the shaft in response to the motor driving the transmission components. The slide assembly comprises a slide coupled to the shaft, a pivot bar coupled to the slide, and pick blades pivotally coupled to the pivot bar. A linear motion of the slide assembly along the shaft drives a linear translation of the pivot bar. The linear translation drives a pick blade of the slide assembly to move towards a side of the cage and out of the space and to pivot to a raised position to contact and lift a disc upwards into a disc gripper device.

20 Claims, 22 Drawing Sheets

(51) Int. Cl.
*G11B 17/22* (2006.01)
*G11B 23/03* (2006.01)

(58) Field of Classification Search
CPC ... G11B 15/6835; G11B 17/038; G11B 17/08; G11B 23/0325; G11B 17/225; G11B 2220/2537
See application file for complete search history.

(56) References Cited

U.S. PATENT DOCUMENTS

| | | | |
|---|---|---|---|
| 5,431,520 A | 7/1995 | Brugger | |
| 5,586,094 A * | 12/1996 | Pines | G11B 17/225 |
| | | | 369/30.85 |
| 5,805,561 A | 9/1998 | Pollard | |
| 5,828,633 A * | 10/1998 | Inatani | G11B 17/24 |
| | | | 369/30.86 |
| 5,893,699 A | 4/1999 | Dadiomov | |
| 5,953,293 A * | 9/1999 | Kajiyama | G11B 17/24 |
| | | | 369/30.86 |
| 5,959,958 A * | 9/1999 | Inatani | G11B 17/30 |
| | | | 369/30.85 |
| 6,016,291 A | 1/2000 | Joos | |
| 6,212,139 B1 * | 4/2001 | Nakamura | G11B 17/28 |
| | | | 369/30.85 |
| 6,259,579 B1 | 7/2001 | Mueller | |
| 6,820,271 B2 * | 11/2004 | Schafer | G11B 33/0444 |
| | | | 369/30.79 |
| 6,977,872 B2 * | 12/2005 | Nagone | G11B 17/24 |
| | | | 369/30.79 |
| 9,230,591 B2 * | 1/2016 | Kinoshita | G11B 17/22 |
| 9,251,842 B1 * | 2/2016 | Ehlen | G11B 17/225 |
| 9,558,781 B1 | 1/2017 | Fordham | |
| 9,601,149 B1 | 3/2017 | Todd | |
| 9,672,863 B1 * | 6/2017 | Altknecht | G11B 17/0284 |
| 9,741,389 B1 * | 8/2017 | Altknecht | G11B 17/038 |
| 9,741,390 B1 * | 8/2017 | Altknecht | G11B 17/225 |
| 10,438,629 B2 * | 10/2019 | Altknecht | G11B 17/038 |
| 2003/0130759 A1 | 7/2003 | Kesil | |
| 2003/0222926 A1 | 12/2003 | Cummins | |
| 2004/0264042 A1 | 12/2004 | Pollard | |
| 2006/0005209 A1 * | 1/2006 | Chiang | G11B 17/225 |
| | | | 720/600 |
| 2007/0201164 A1 | 8/2007 | Bauck | |
| 2010/0287576 A1 | 11/2010 | Terzis | |
| 2012/0117578 A1 | 5/2012 | Goyal | |
| 2018/0211691 A1 | 7/2018 | Altknecht | |

OTHER PUBLICATIONS

Hitachi, Ltd., "Optical library system for Long term preservation with extended error correction coding," May 7, 2013, pp. 1-18, Retrieved from: http://storageconference.us/2013/Presentations/Watanabi.pdf, Tokyo, Japan.

* cited by examiner

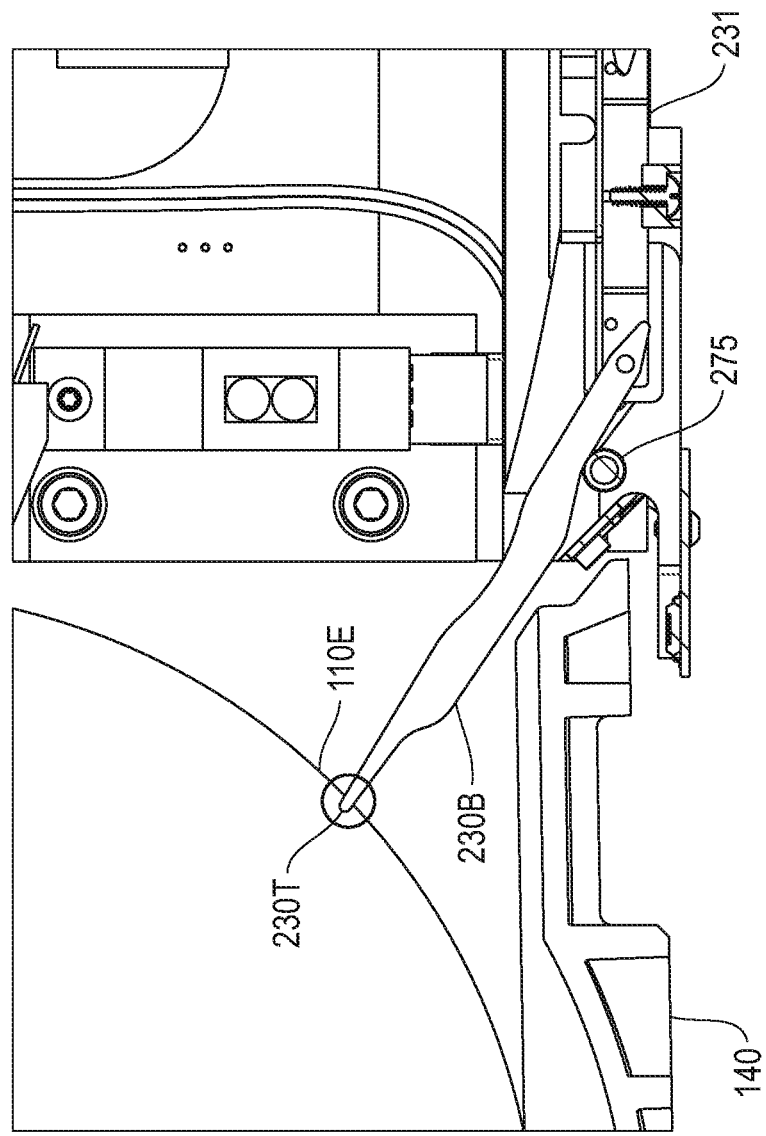

700

| Moving a Disc Gripper Device to a Side of a Guide Cage Until the Disc Gripper Device is Positioned Above a Disc Cassette Positioned On the Same Side of the Guide Cage | — 701 |

↓

| Using One or More Motor-Driven Transmission Components to Drive a Linear Translation of a Pivot Bar Coupled to a Pick Blade Maintained in a Vertical Space Below the Guide Cage, Wherein the Linear Translation Causes the Pick Blade to Move Towards the Same Side of the Guide Cage | — 702 |

↓

| Rolling a Portion of the Pick Blade on Top of a Roller Cam Guide to Control a Path of a Tip of the Pick Blade as the Pick Blade Moves Out of the Space and Pivots to a Raised Position | — 703 |

↓

| Making Contact with an Edge of a Disc in the Disc Cassette via the Tip when the Pick Blade is In the Raised Position | — 704 |

↓

| Lifting the Disc from the Disc Cassette Upwards Into the Disc Gripper Device via the Tip when the Pick Blade is in the Raised Position | — 705 |

FIG. 12

METHOD AND SYSTEM FOR SELECTING AND MOVING A SINGLE DISC IN AN OPTICAL DISC LIBRARY The present invention generally relates to disc libraries, and more particularly, to a method and system for selecting and moving a single disc in an optical disc library.

BACKGROUND

Disc libraries, such as optical disc libraries, may be used for archival storage. Discs, such as optical storage discs, are stored within a disc library such that they are accessible by a disc retrieval unit (DRU) able to move single discs between storage locations and drives that read data from and write data to the discs. A disc selector system is needed as part of the DRU to allow single discs to be reliably selected and secured for transport by the DRU without disturbing other discs in the disc library.

SUMMARY

One embodiment provides a system comprising a motor and a disc selector mechanism. The disc selector mechanism is coupled to a bottom of a guide cage and maintained in a space below the guide cage. The disc selector mechanism comprises a shaft, one or more transmission components, and a slide assembly that is laterally slidable along the shaft in response the motor driving the one or more transmission components. The slide assembly comprises a slide coupled to the shaft, a pivot bar coupled to the slide, and one or more pick blades pivotally coupled to the pivot bar. A linear motion of the slide assembly along the shaft drives a linear translation of the pivot bar. The linear translation drives a pick blade of the slide assembly to move towards a side of the guide cage and out of the space and to pivot to a raised position to contact and lift a disc upwards into a disc gripper device.

Another embodiment provides an apparatus comprising a disc cassette for maintaining one or more discs, a guide cage, a disc gripper device for moving a disc into or out of the guide cage, a motor, and a disc selector mechanism coupled to a bottom of the guide cage and maintained in a space below the guide cage. The disc selector mechanism comprises a shaft, one or more transmission components, and a slide assembly that is laterally slidable along the shaft in response to the motor driving the one or more transmission components. The slide assembly comprises a slide coupled to the shaft, a pivot bar coupled to the slide, and one or more pick blades pivotally coupled to the pivot bar. A linear motion of the slide along the shaft drives a linear translation of the pivot bar, and the linear translation drives a pick blade of the slide assembly to move towards a side of the guide cage and out of the space and to pivot to a raised position to contact and lift a disc from the disc cassette upwards into the disc gripper device.

One embodiment provides a computer program product comprising a computer readable storage medium having program code embodied therewith, the program code being executable by a computer to implement a method for selecting and moving a single disc in an optical disc library. The method comprises moving a disc gripper device to a side of a guide cage until the disc gripper device is positioned above a disc cassette positioned on the side of the guide cage, and driving a linear translation of a pivot bar coupled to a pick blade maintained in a space below the guide cage via one or more motor-driven transmission components. The linear translation causes the pick blade to move towards the side of the guide cage and out of the space and to pivot to a raised position to contact and lift a disc from the disc cassette upwards into the disc gripper device.

These and other aspects, features and advantages of the invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 7 illustrates an example limiting position of a tip of a pick blade of the slide assembly relative to a position of a disc fully in the disc gripper device, in accordance with an embodiment of the invention;

FIG. 12 is a flowchart for an example process for selecting and moving a single disc in an optical disc library, in accordance with an embodiment of the invention.

DETAILED DESCRIPTION

Figure 1:
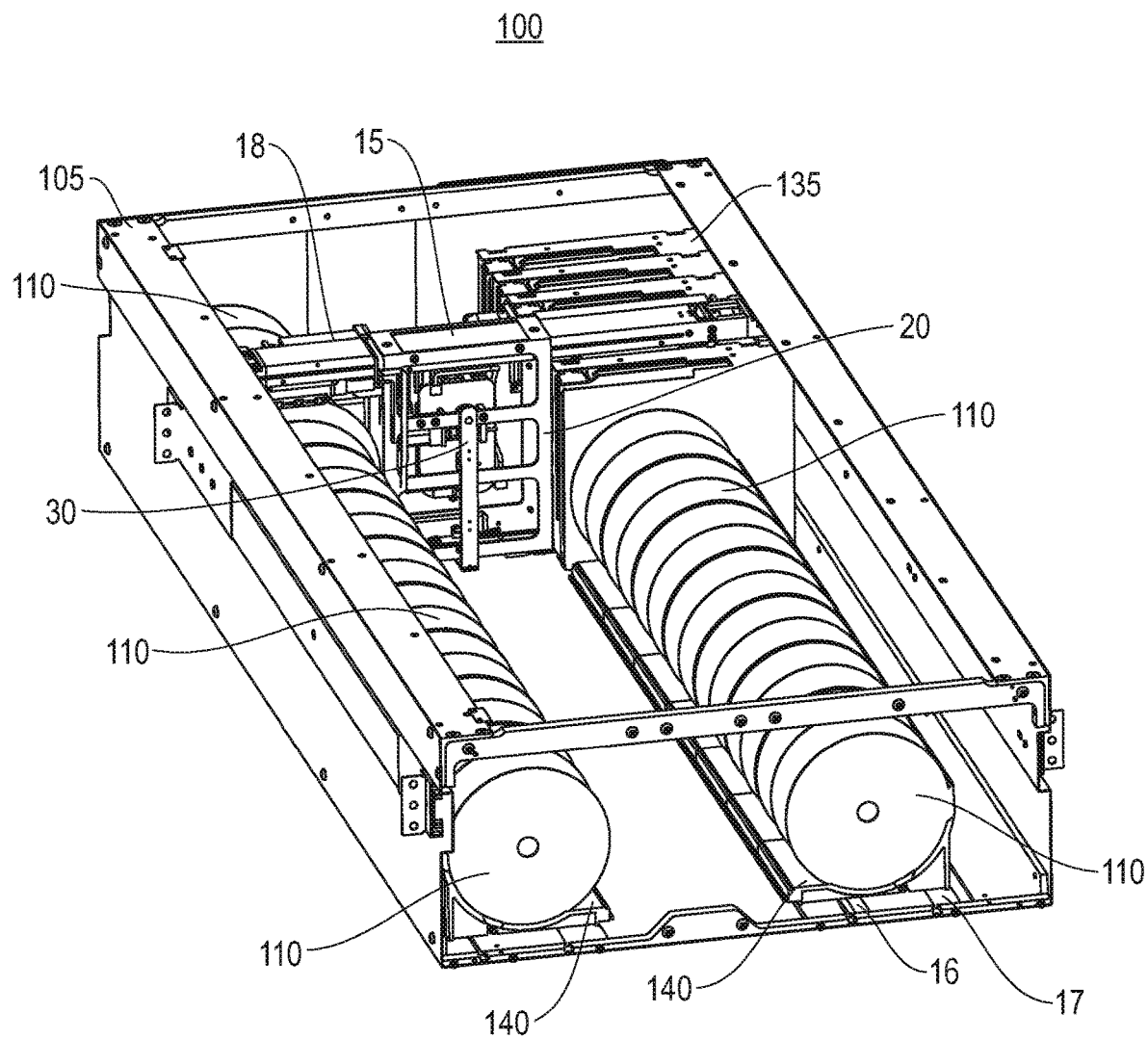
FIG. 1 illustrates example components of an optical disc library.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention generally relates to disc libraries, and more particularly, to a method and system for selecting and moving a single disc in an optical disc library. One embodiment provides a system comprising a motor and a disc selector mechanism. The disc selector mechanism is coupled to a bottom of a guide cage and maintained in a space below the guide cage. The disc selector mechanism comprises a shaft, one or more transmission components, and a slide assembly that is laterally slidable along the shaft in response to the motor driving the one or more transmission components. The slide assembly comprises a slide coupled to the shaft, a pivot bar coupled to the slide, and one or more pick blades pivotally coupled to the pivot bar. A linear motion of the slide assembly along the shaft drives a linear translation of the pivot bar. The linear translation drives a pick blade of the slide assembly to move towards a side of the guide cage and out of the space and to pivot to a raised position to contact and lift a disc upwards into a disc gripper device. The pick blade pivots at a rate controlled by a profile of a bottom edge of the pick blade as it translates in contact with a roller cam guide.

Another embodiment provides an apparatus comprising a disc cassette for maintaining one or more discs, a guide cage, a disc gripper device for moving a disc into or out of the guide cage, a motor, and a disc selector mechanism coupled to a bottom of the guide cage and maintained in a space below the guide cage. The disc selector mechanism comprises a shaft, one or more transmission components, and a slide assembly that is laterally slidable along the shaft in response to the motor driving the one or more transmission components. The slide assembly comprises a slide coupled to the shaft, a pivot bar coupled to the slide, and one or more pick blades pivotally coupled to the pivot bar. A linear motion of the slide along the shaft drives a linear translation of the pivot bar, and the linear translation drives a pick blade of the slide assembly to move towards a side of the guide cage and out of the space and to pivot to a raised position to contact and lift a disc from the disc cassette upwards into the disc gripper device.

One embodiment provides a computer program product comprising a computer readable storage medium having program code embodied therewith, the program code being executable by a computer to implement a method for selecting and moving a single disc in an optical disc library. The method comprises moving a disc gripper device to a side of a guide cage until the disc gripper device is positioned above a disc cassette positioned on the side of the guide cage, and driving a linear translation of a pivot bar coupled to a pick blade maintained in a space below the guide cage via one or more motor-driven transmission components. The linear translation causes the pick blade to move towards the side of the guide cage and out of the space and to pivot to a raised position to contact and lift a disc from the disc cassette upwards into the disc gripper device.

An optical disc storage system with many closely spaced discs requires a disc selector mechanism for selecting individual discs for transport to a disc drive. The mechanism must be fast and highly accurate to select a disc, which will typically have nearby neighbors, with minimal delay and without damaging or displacing any adjacent discs. The mechanism must also be highly reliable and have long lifetime. These requirements imply that the mechanism should have low friction and minimal play. It is also desirable for the mechanism to require minimal vertical space because of height limitations on the library design that arise from the need to rack-mount library units.

FIG. 1 illustrates example components of an optical disc library 100. The optical disc library 100 is a high performance optical storage system comprising a library enclosure 105. The enclosure 105 includes a plurality of optical discs 110 residing in one or more disc cassettes 140, tracks 16 and 17 that hold the disc cassettes 140 in place, and one or more optical disc drives 135. The enclosure 105 provides a stable platform and protection from the environment. In one example, the enclosure 105 includes filter material connected to cooling fans (not shown) and a top enclosure (not shown for internal viewing). In one example, the enclosure 105 may be sized as a typical 19-inch rack mounted device with rack mounting connectors. Depending on the space and enclosure size chosen, the enclosure 105 may have a greater capacity of optical disc drives 135, disc cassettes 140, and thus, discs 110. In one example, the disc cassettes 140 are placed within the enclosure 105 on either side (e.g., left and right sides) of the enclosure 105. In one example, additional disc cassettes 140 and discs 110 space is available adjacent the optical disc drives 135 (e.g., towards the front of the enclosure 105). In wider enclosures 105, more optical disc drives 135 may be positioned adjacent each other on the left and right side of the enclosure 105 when more available space for optical disc drives 135 is available.

The optical disc library 100 may implement a conventional (i.e., prior art) optical disc retrieval unit (DRU) 15 comprising a conventional disc selector system 30, a moveable bridge arm 18, a guide cage 20, and a disc gripper device 61 (FIG. 2) that allow the DRU 15 to select, secure, and move the discs 110 between the disc cassettes 140 and the optical disc drives 135. In one example, the bridge arm 18 moves using motors and gears on tracks within the enclosure 105 to move the DRU 15 from the back of the enclosure 105 to the front of the enclosure 105. In one example, the disc gripper device 61 is moveable to either side of the enclosure 105 (e.g., via a motor and lead screw in the bridge arm 18 of the DRU 15), allowing the DRU 15 to retrieve a disc 110 for placement in an optical disc drive 135 or for replacement back into a disc cassette 140. In other embodiments, other configurations of stored discs 110, optical disc drives 135, and the DRU 15 may be used for employment of the disc gripper device 61 for disc placement, transport and loading (e.g., into an optical disc drive 135, into a disc holder or cassette 140), etc.

Figure 2:
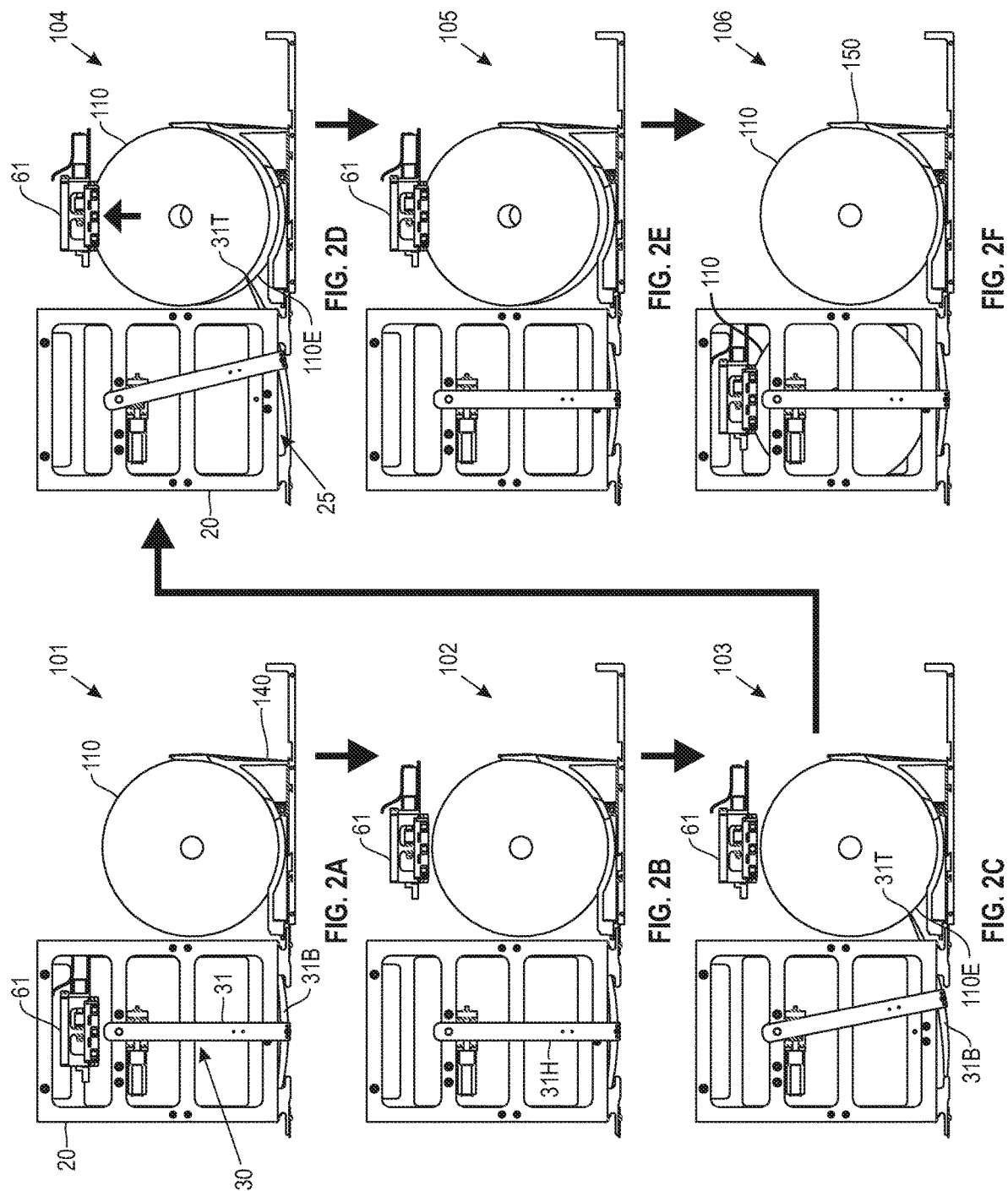
FIG. 2 is a sequence of panels illustrating operations performed by a conventional disc selector system in an optical disc library for selecting and securing a disc.

FIG. 2 is a sequence of panels 101-106 illustrating operations performed by a conventional disc selector system 30 in an optical disc library 100 for selecting and securing a disc 110. For example, the optical disc library 100 may implement the DRU 15 that supports the guide cage 20 and one or more disc cassettes 140. In one example, each disc cassette 140 is placed on either side (e.g., left side and right side) of the guide cage 20. Each disc cassette 140 comprises a plurality of cassette slots (not shown) for maintaining and holding in place a plurality of optical discs 110. Optical discs 110 in a disc cassette 140 are closely spaced.

The moveable bridge arm 18 may be driven to align the DRU 15 with discs 110 in disc cassettes 140 or optical disc drives 135 by one or more pinion gears on the DRU 15 that engage one or more rack gears mounted in the library enclosure 105.

The conventional disc selector system 30 shown in FIG. 2 is configured to select an individual disc 110 from a disc cassette 140, and lift/push the selected disc 110 into the disc gripper device 61. The disc selector system 30 comprises a rotatable pick arm 31 including a handle 31H and a pair of opposing pick blades 31B extending from an end of the handle 31H. When the pick arm 31 is not rotated, the pick arm 31 is positioned at a resting position with pick handle 31H essentially vertical, as shown in panels 101 and 102 of FIGS. 2A-B, so that the pick blades 31B are maintained within a vertical space 25 below the guide cage 20. In the resting position, each pick blade 31B does not extend out of the vertical space 25 and beyond the guide cage 20.

The handle 31H is rotatable via motors and gears within the guide cage 20 (e.g., a worm gear and a worm wheel). For example, rotating the handle 31H in a first direction (e.g., clockwise direction) causes a first pick blade 31B of the pick arm 31 to pivot/swing towards a first side (e.g., left side) of the guide cage 20, such that a tip 31T of the first pick blade 31B moves out of the vertical space 25 to contact an edge 110E of a disc 110 resting in a disc cassette 140 placed on the first side. The tip 31T of the first pick blade 31B lifts/pushes the disc 110 into the disc gripper device 61 as the handle 31H continues to rotate in the first direction. Similarly, rotating the handle 31H in a second direction (e.g., counterclockwise direction) causes a second pick blade 31B of the pick arm 31 to pivot/swing towards a second side (e.g., right side) of the guide cage 20, such that a tip 31T of the second pick blade 31B moves out of the vertical space 25 to contact an edge 110E of a disc 110 resting in a disc cassette 140 placed on the second side. The tip 31T of the second pick blade 31B lifts/pushes the disc 110 into the disc gripper device 61 as the handle 31H continues to rotate in the second direction.

The disc gripper device 61 is moveable (e.g., via a motor and lead screw in the bridge arm 18 of the DRU 15) between different locations relative to the guide cage 20 (e.g., from the lateral center the guide cage 20 to a position above a disc 110 in a disc cassette 140, as shown in panels 101-106 of FIGS. 2A-F, allowing the disc gripper device 61 to either retrieve a disc 110 from a disc cassette 140 for transport to an optical disc drive 135 or to return a disc 110 from an optical disc drive 135 for replacement back into a disc cassette 140. The disc gripper device 61 may comprise one or more jaws for gripping a disc 110.

As shown in panels 101-102 of FIGS. 2A-B, the pick arm 31 is in the resting position, and the disc gripper device 61 is moved to a side (e.g., right side) of the guide cage 20 and positioned above a disc cassette 40 placed on the same side. As shown in panel 103 of FIG. 2C, the pick arm 31 is rotated to pivot/swing a pick blade 31B of the pick arm 31 towards the same side, such that a tip 31T of the pick blade 31B moves out of the vertical space 25 to contact an edge 110E of a disc 110 resting in the disc cassette 140. As shown in panel 104 of FIG. 2D, as the pick arm 31 continues to rotate, the tip 31T, in combination with the disc cassette 140 or a back wall 150 of the disc cassette 140, lifts/pushes the disc 110 upward into the disc gripper device 61. When the disc 110 is lifted/pushed into the disc gripper device 61, the pick arm 31 is rotated to pivot/swing the pick arm 31 back to the resting position. As shown in panels 105-106 of FIGS. 2E-F, the disc gripper device 61 holds and moves the selected disc 110 to the center of guide cage 20, allowing it to be rapidly transported by the DRU 15 to other locations in the optical disc library 100, such as an optical disc drive 135 or another cassette slot of a disc cassette 140.

The disc selector system 30 has multiple drawbacks. For example, large backlash is typical of worm/worm wheel gear combinations, since such combinations cannot mesh too tightly without incurring severe friction and suffering rapid wear. Such backlash makes it difficult to accurately control and stabilize the position of the pick arm 31. As another example, an amount of vertical space 25 below the guide cage 20 required for the pick arm 31 to swing is more than is desirable. As yet another example, the disc selector 30 utilizes only a simple positioning sensing mechanism to detect a position of the pick arm 31 when the pick arm 31 is not centered (i.e., not in the resting position), such as whether the pick arm 31 is to a left or a right of the center of the guide cage 20, and an approximate position of the pick arm 31 when the pick arm 31 is within millimeters of being centered.

Embodiments of the invention provide a disc selector system for an optical disc library. In one embodiment, the disc selector system comprises a disc selector mechanism that is compact (e.g., requires less vertical space). In one embodiment, the disc selector mechanism utilizes a linear motion of a slide assembly that includes one or more articulated cam-guided pick blades to contact and lift/push single discs upwards from locations in the library (e.g., disc cassettes) into a disc gripper device for transport to disc drives. Unlike the prior art disc selector system 30 in FIG. 2, the disc selector mechanism is vertically more compact and has less backlash. As described in detail later herein, the disc selector mechanism is configured to contact and move only a single selected disc without contacting or moving any other disc in the library. The disc selector mechanism can work with a large array of closely spaced discs, and is configured to contact only an edge of a selected disc. The disc selector mechanism also incorporates an encoder and codestrip to provide position data that can be used to accurately control the speed and position of a pick tip.

Figure 3:
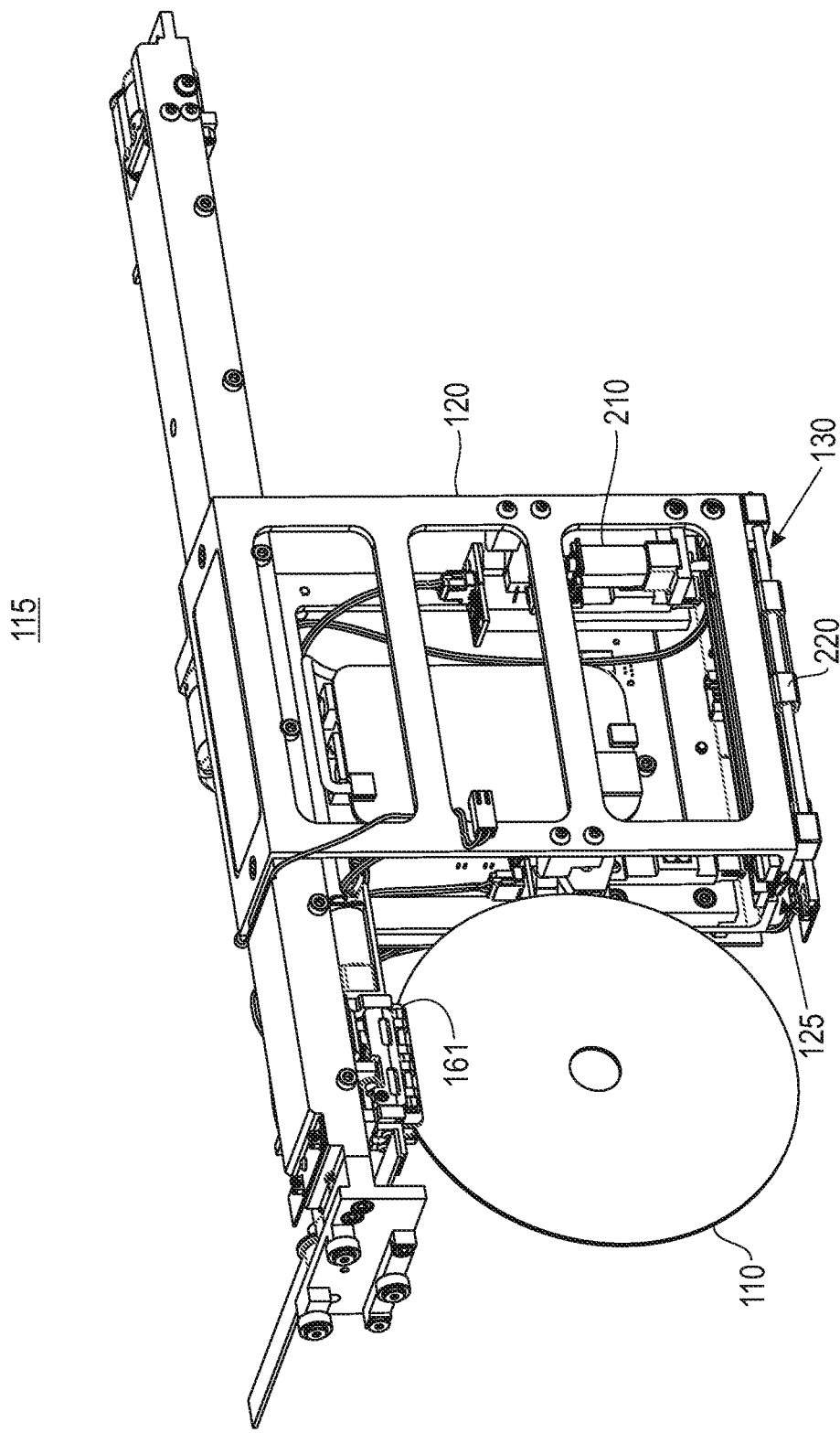
FIG. 3 illustrates a disc retrieval unit (DRU) comprising a disc selector system for selecting and moving a single disc in an optical disc library, in accordance with an embodiment of the invention.

FIG. 3 illustrates a DRU 115 comprising a disc selector system 130 for selecting and moving a single disc in an optical disc library, in accordance with an embodiment. The DRU 115 further comprises a guide cage 120 and a disc gripper device 161. In one embodiment, a high performance optical storage system implements the DRU 115. For example, in one embodiment, the optical disc library 100 in FIG. 1 implements the DRU 115 instead of the conventional DRU 15 (e.g., replacing the conventional DRU 15 with the DRU 115). As stated above, the optical disc library 100 comprises a library enclosure 105, one or more optical disc drives 135, and one or more disc cassettes 140 holding a plurality of discs 110 (FIG. 1). In one embodiment, each disc cassette 140 is placed on either side (e.g., left side and right side) of the optical disc library 100, and the DRU 115 moves the guide cage 120 parallel to disc axes laterally centered between left and right side disc cassettes 140, to align the disc selector system 130 and the disc gripper device 161 with a disc 110 in either a disc cassette 140 or an optical disc drive 135. Each disc cassette 140 comprises a plurality of cassette slots 141 (FIGS. 10-11) for maintaining and holding in place a plurality of optical discs 110. Optical discs 110 in a disc cassette 140 are closely spaced.

In one embodiment, the disc gripper device 161 comprises one or more jaws 165 (FIGS. 6C-6D) for gripping a disc 110 as the DRU 115 transports the disc 110.

In one embodiment, the disc selector system 130 comprises: (1) a disc selector mechanism 220 configured for selecting an individual disc 110 from a disc cassette 140, and lifting/pushing the selected disc 110 upwards into the disc gripper device 161, and (2) a disc selector drive motor 210 configured for driving the disc selector mechanism 220. In one embodiment, the disc selector mechanism 220 is coupled to a bottom 120B (FIG. 4A) of the guide cage 120 and maintained in a vertical space 125 below the guide cage 120. In one embodiment, the disc selector drive motor 210 includes a vertical shaft and is maintained within the guide cage 120.

Figure 4A:
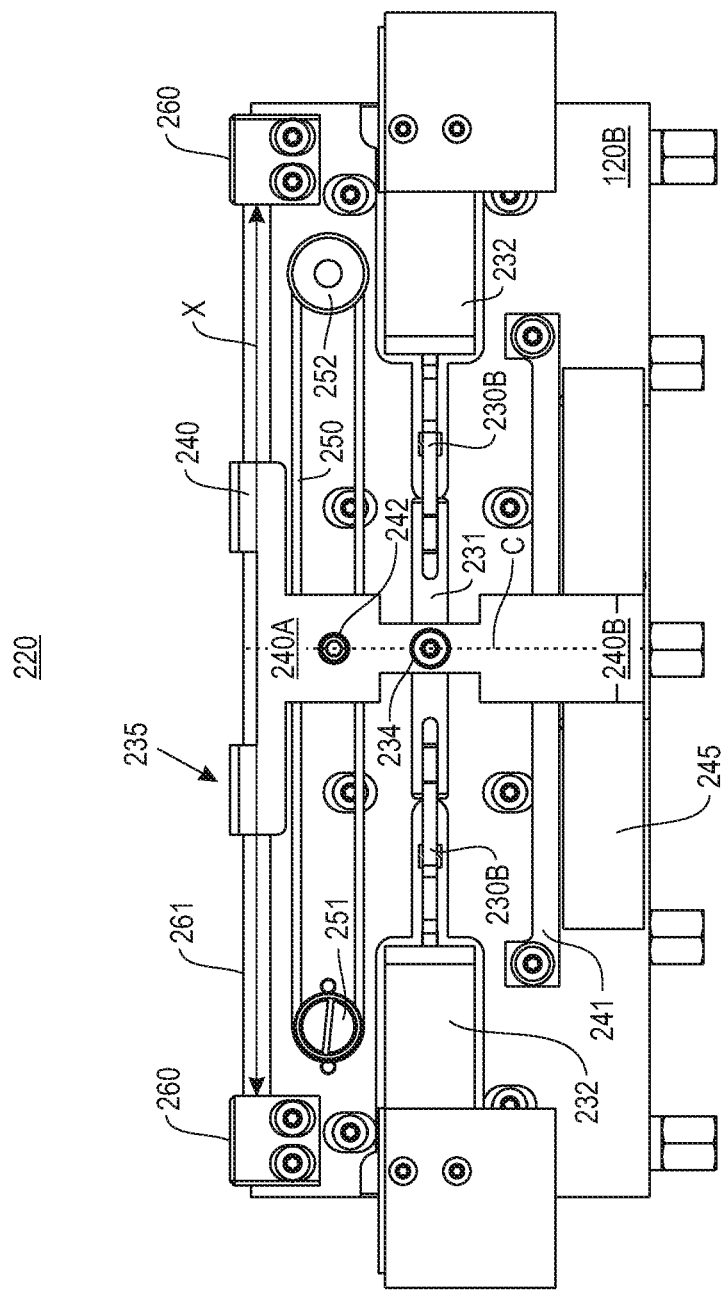
FIG. 4A illustrates a bottom view of the disc selector mechanism, in accordance with an embodiment of the invention.
Figure 4B:
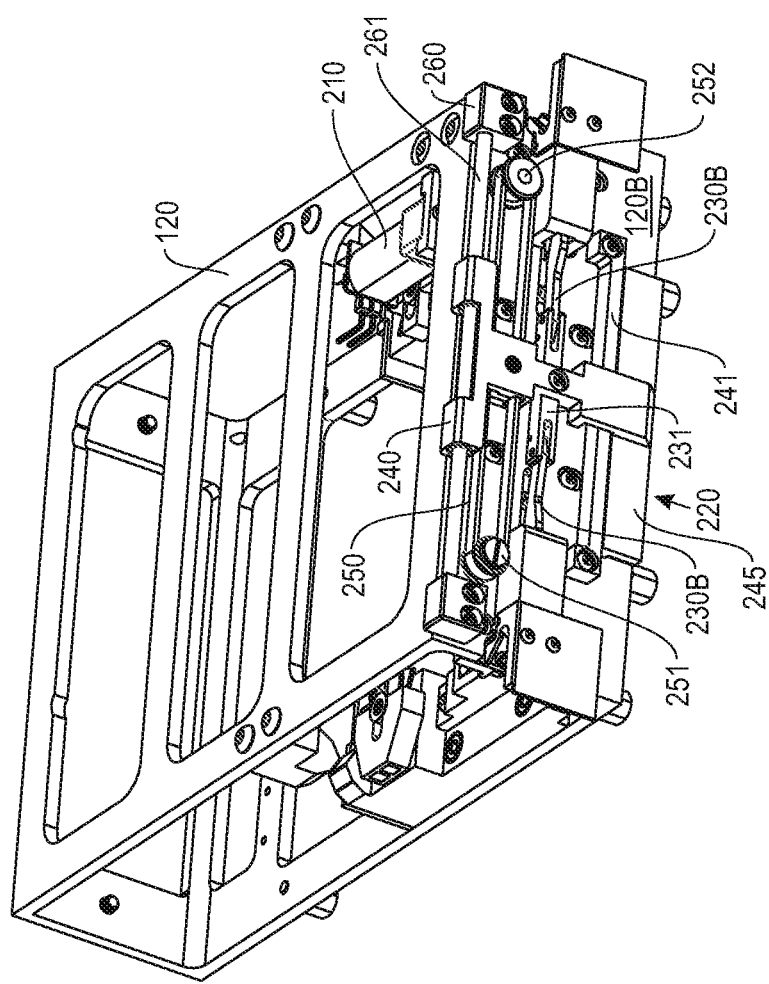
FIG. 4B illustrates a perspective bottom view of the disc selector mechanism, in accordance with an embodiment of the invention.
Figure 4C:
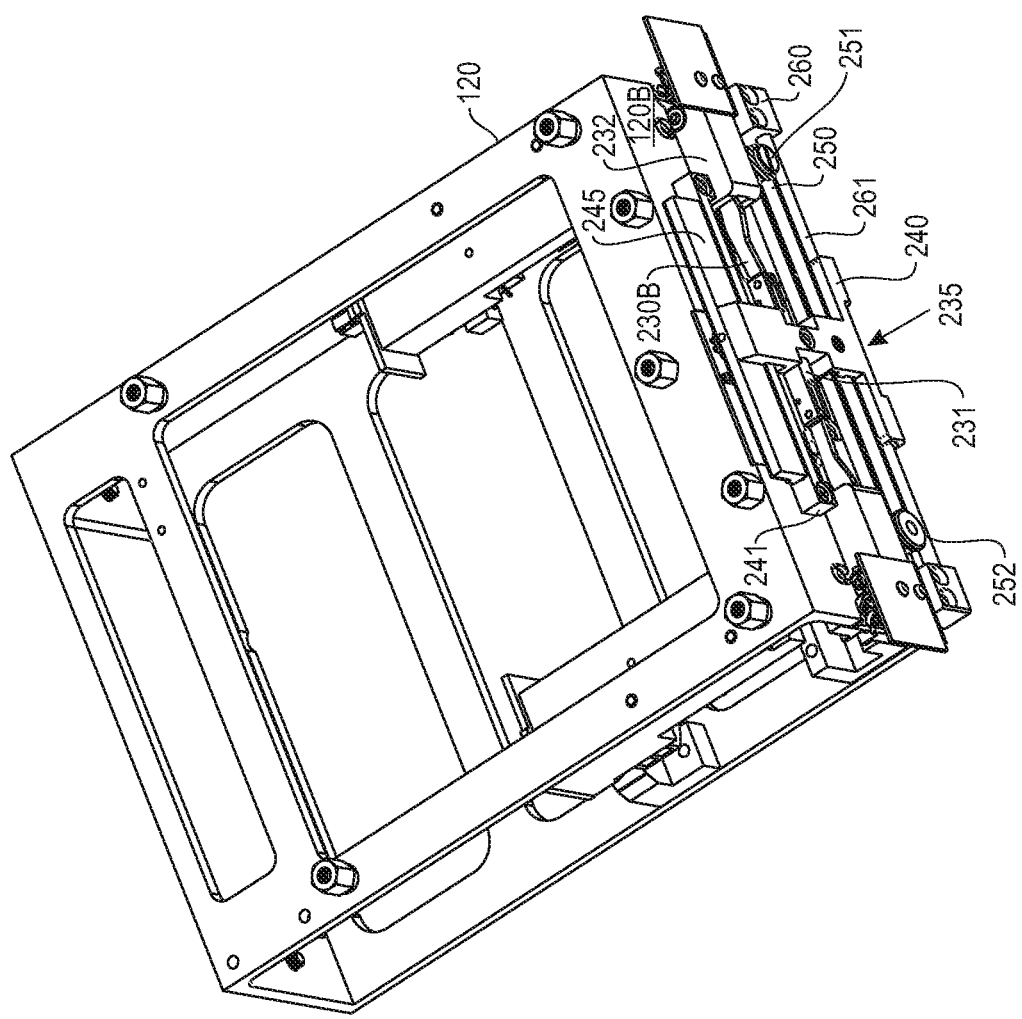
FIG. 4C illustrates another perspective bottom view of the disc selector mechanism, in accordance with an embodiment of the invention.

FIG. 4A illustrates a bottom view of the disc selector mechanism 220, in accordance with an embodiment of the invention. FIG. 4B illustrates a perspective bottom view of the disc selector mechanism 220, in accordance with an embodiment of the invention. FIG. 4C illustrates another perspective bottom view of the disc selector mechanism 220, in accordance with an embodiment of the invention. As shown in FIGS. 4A-4C, the disc selector mechanism 220 comprises a slide assembly 235 and a polished shaft 261. The shaft 261 is supported by one or more shaft support blocks 260 coupled to the bottom 120B of the guide cage 120. In one embodiment, the shaft 261 includes a pair of opposing ends, wherein each end of the shaft 261 is supported by a corresponding shaft support block 260.

Figure 4D:
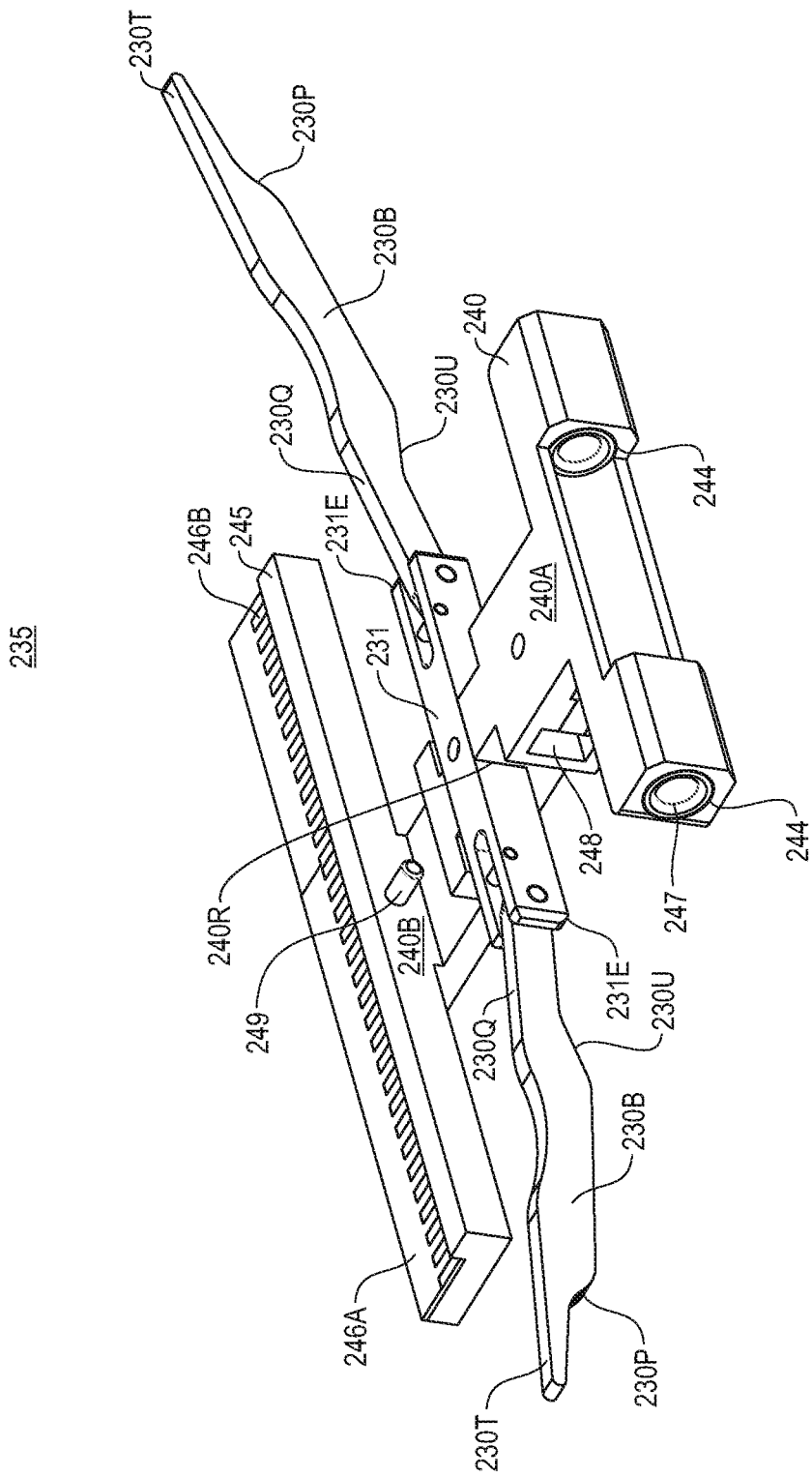
FIG. 4D illustrates a top and isolated view of a slide assembly of the disc selector mechanism, in accordance with an embodiment of the invention.

FIG. 4D illustrates a top and isolated view of the slide assembly 235, in accordance with an embodiment of the invention. As shown in FIGS. 4A-4D, in one embodiment, the slide assembly 235 comprises: (1) a slide 240 with a pair of opposing ends including a first end 240A and a second end 240B, (2) one or more pick blades 230B, and (3) a pick blade pivot bar 231 for pivoting the one or more pick blades 230B. As shown in FIG. 4D, in one embodiment, the slide 240 comprises one or more openings 247 shaped for receiving the shaft 261. The shaft 261 is passed through the one or more openings 247.

As shown in FIG. 4D, in one embodiment, the slide 240 incorporates one or more low-friction bushings 244 and a dowel pin 249, and is slidable along the shaft 261. For example, in one embodiment, each opening 247 includes a low-friction bushing 244 that allows the slide 240 to slide along the shaft 261 with low friction. As shown in FIGS. 4A-4C, in one embodiment, the disc selector mechanism 220 further comprises a front guide rail 241 coupled to the bottom 120B of the guide cage 120. The dowel pin 249 engages a groove/slot 241S (FIGS. 8 and 9B) in the front guide rail 241 to prevent the slide 240 from rotating about the shaft 261.

As described in detail later herein, in one embodiment, the slide 240 is laterally slidable along the shaft 261 to different positions relative to a center C of the guide cage 120 ("guide cage center C"), wherein the guide cage center C is illustrated using a dashed line (FIG. 4A). The different positions include, but are not limited to, the following: (1) a center position, with the center of the slide 240 substantially aligned with guide cage center C, (2) a set of positions that are to a first side of the guide cage center C (e.g., left side), and (3) a set of positions that are to a second side of the guide cage center C (e.g., right side). A linear movement X (FIG. 4A) of the slide 240 along the shaft 261 is illustrated using a bidirectional arrow.

The disc selector mechanism 220 further comprises one or more transmission components. In one embodiment, the one or more transmission components comprise: (1) a timing belt 250 positioned adjacent to the slide 240 for driving the slide 240, and (2) a timing belt pulley 252 for driving the timing belt 250. Specifically, the disc selector drive motor 210 is configured to drive the timing belt pulley 252. Driving the timing belt pulley 252 drives the timing belt 250, which in turn drives the slide 240, causing the slide 240 to slide along shaft 261. The timing belt 250 controls a lateral position of the slide 240 on the shaft 261.

In another embodiment, the one or more transmission components comprise different components instead. For example, in one embodiment, the one or more transmission components comprise a belt and a pulley (e.g., without teeth). As another example, in one embodiment, the one or more transmission components comprise a pinion gear (e.g., mounted on the vertical shaft of the disc selector drive motor 210) and a rack gear (e.g., mounted on the slide 240). As yet another example, in one embodiment, the one or more transmission components comprise a smooth roller (e.g., mounted on the vertical shaft of the disc selector drive motor 210) and a smooth roller contact surface (e.g., mounted on or part of the slide 240).

The timing belt 250 has a corresponding adjustable idler pulley 251 for adjusting a tension of timing belt 250. As described in detail later herein, a position of idler pulley 251 relative to the timing belt 250 is adjustable to tighten or loosen timing belt 250.

In one embodiment, the second end 240B of the slide 240 includes a shelf 245. As described in detail later herein, the shelf 245 comprises one or more code strips.

Figure 5A:
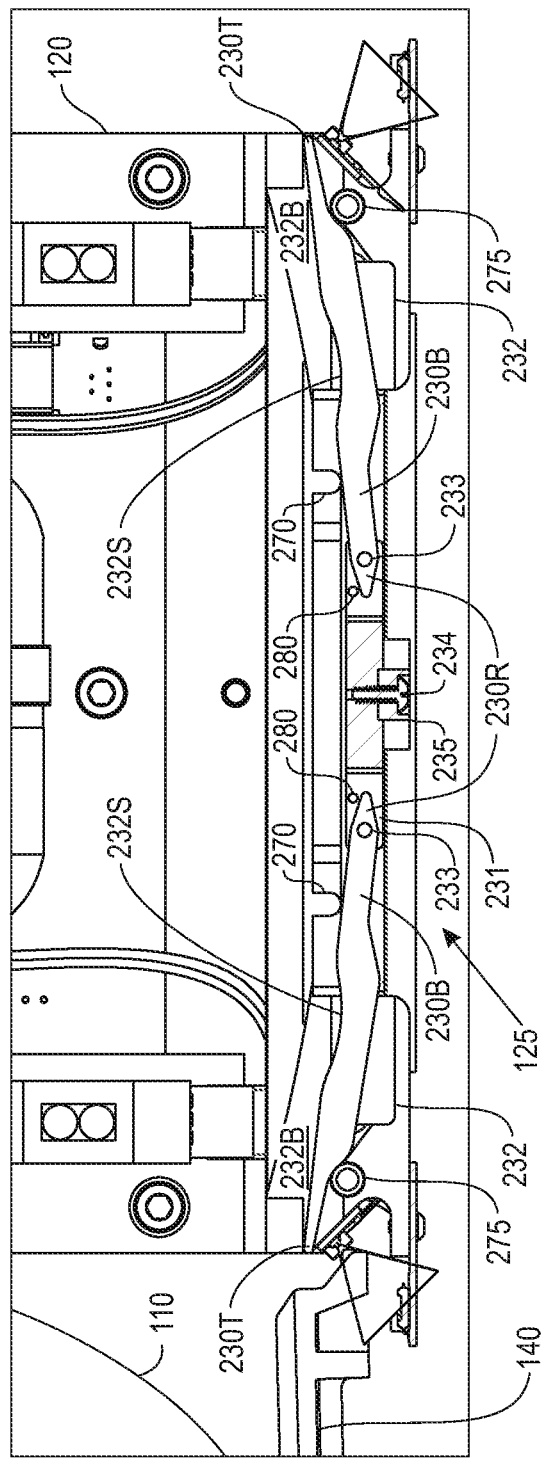
FIG. 5A illustrates a cross-sectional view of the disc selector mechanism when the slide assembly is centered, in accordance with an embodiment of the invention.
Figure 5B:
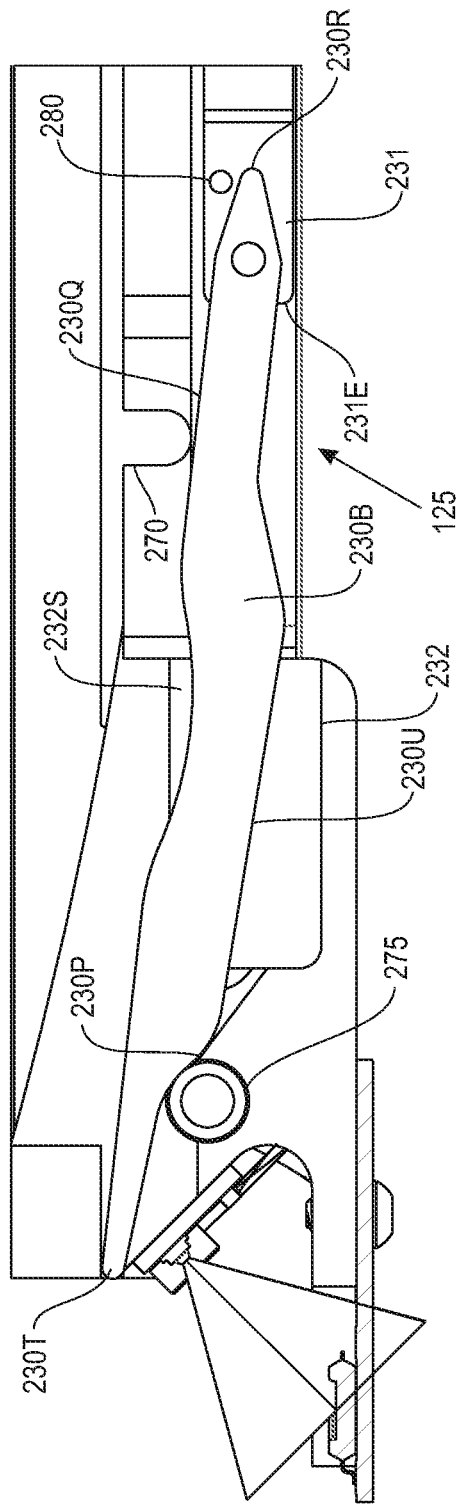
FIG. 5B illustrates a cross-sectional close-up view of a portion of the disc selector mechanism when the slide assembly is centered, in accordance with an embodiment of the invention.

In one embodiment, each pick blade 230B includes a pair of opposing ends comprising a pivot end 230R (FIG. 5A) and a tip 230T (FIG. 5A). The pivot bar 231 includes a pair of opposing ends 231E (FIGS. 5B and 9). A pivot end 230R of each pick blade 230B is pivotally coupled to an opposing end 231E of the pivot bar 231 via a connector 233 (FIG. 5A), such as a pivot pin or another type of fastener or connection mechanism. The pivot bar 231 is positioned in between the one or more pick blades 230B.

For example, in one embodiment, the slide assembly 235 includes a pair of opposing pick blades 230B comprising a first pick blade 230B and a second pick blade 230B, as shown in FIGS. 4A-4C. The motor-driven timing belt 250 drives a linear translation of the pivot bar 231 coupled to the pair of opposing pick blades 230B. Each pick blade 230B corresponds to a particular side of the guide cage 120. For example, in one embodiment, the first pick blade 230B corresponds to a first side of the guide cage 120 (e.g., left side), and the second pick blade 230B corresponds to a second side of the guide cage 120 (e.g., right side) that is opposite to the first side. As described in detail later herein, a tip 230T of each pick blade 230B is designed/shaped to contact and lift/push a disc 110 from a disc cassette 140 positioned on a corresponding side of the guide cage 120 upwards into the disc gripper device 161.

In one embodiment, the slide 240 includes a recess 240R (FIG. 4D) for receiving and maintaining a portion of the pivot bar 231. In one embodiment, a connector 234 (FIG. 4A), such as a screw or another type of fastener or connection mechanism, is used to secure the pivot bar 231 inside the recess 240R.

In one embodiment, sliding the slide 240 along the shaft 261 drives the pivot bar 231 to move along a straight line. A linear movement of the pivot bar 231 drives a pick blade 230B to either: (1) move outwards towards a corresponding side of the guide cage 120 (i.e., move out of the vertical space 125 and beyond the guide cage 120) and to pivot to a raised position, or (2) move inwards away from the corresponding side (i.e., move further into the vertical space 125). For example, sliding the slide 240 along the shaft 261 to a position that is to the first side of the guide cage center C (e.g., left side) drives the pivot bar 231 to move in a straight line towards the first side of the guide cage center C, which in turn causes the first pick blade 230B to move outwards towards the first side of the guide cage 120 (e.g., left side) and a tip 230T of the first pick blade 230B to pivot upwards to a raised position to contact and lift/push a disc 110 from a disc cassette 140 positioned on the first side upwards into the disc gripper device 161. Similarly, sliding the slide 240 along the shaft 261 to a position that is to the second side of the guide cage center C (e.g., right side) drives the pivot bar 231 to move in a straight line towards the second side of the guide cage center C, which in turn causes the second pick blade 230B to move outwards towards the second side of the guide cage 120 (e.g., right side) and a tip 230T of the second pick blade 230B to pivot upwards to a raised position to contact and lift/push a disc 110 from a disc cassette 140 positioned on the second side upwards into the disc gripper device 161.

The disc selector mechanism 220 further comprises one or more guides 232 for limiting unwanted motions of a pick blade 230B. In one embodiment, each pick blade 230B has a corresponding guide 232 comprising: (1) a slot 232S (FIGS. 5A-5B and FIG. 9B) designed/shaped for receiving a portion of the pivot bar 231, and (2) a slot 232B (FIGS. 5A and 9B) designed/shaped for limiting a motion of the pick blade 230B as the pick blade 230B moves towards and away from a corresponding side of the guide cage 120 (i.e., side-to-side motion). The one or more guides 232 thus ensure minimal play of the pick blade 230B in any direction.

In one embodiment, the front guide rail 241 is positioned adjacent to the shelf 245. The shelf 245 includes a protruding pin 249 (FIG. 4D) designed/shaped to engage with the groove/slot 241S (FIGS. 8 and 9B) in the front guide rail 241 to limit a rotation/pivot range of the slide 240 and slide assembly 235 about the shaft 261.

As shown in FIG. 4D, one side of the shelf 245 maintains one or more code strips such as, but not limited to, the following: (1) a left-right code strip 246A readable by the photo interrupter 290 (FIG. 8) to detect a position of the slide 240 on the shaft 261 relative to the guide cage center C, and (2) a high-resolution code-strip 246B readable by the encoder 295 to detect and measure direction and extent of movement of the slide 240.

FIG. 5A illustrates a cross-sectional view of the disc selector mechanism 220 when the slide assembly 235 is centered, in accordance with an embodiment of the invention. As shown in FIG. 5A, each tip 230T of each pick blade 230B does not extend out of the vertical space 125 and beyond the guide cage 120 when the slide assembly 235 is centered.

In one embodiment, the disc selector mechanism 220 comprises one or more roller cam guides 275. As shown in FIG. 5A, in one embodiment, each pick blade 230B has a corresponding roller cam guide 275 positioned below the pick blade 230B for controlling a path of a tip 230T of the pick blade 230B as the pick blade 230B moves towards a corresponding side of the guide cage 120, such that the tip 230T follows a desired path. For example, in one embodiment, a tip 230T of a pick blade 230B follows a cam-guided path that is designed (i.e., customized or tailored) such that the tip 230T contacts an edge 110E of a disc 110 and lifts/pushes the disc 110 upwards into the disc gripper device 161 as an underside (i.e., bottom edge) 230U (FIG. 5B) of the pick blade 230B translates in contact with a corresponding roller cam guide 275.

Each pick blade 230B is designed/shaped such that when the pick blade 230B moves towards a disc 110, an underside 230U of the pick blade 230B is guided by a corresponding roller cam guide 275, causing a tip 230T of the pick blade 230B to follow a desired path. The path is designed such that the tip 230T moves out of the vertical space 125 and upwards to lift/push a selected disc 110 upwards into a disc gripper device 161. The pick blade 230B pivots at a rate controlled by a profile of the underside 230U of the pick blade 230B as it translates in contact with the corresponding roller cam guide 275.

In one embodiment, the disc selector mechanism 220 comprises one or more guide bosses 270. As shown in FIG. 5A, in one embodiment, each pick blade 230B has a corresponding guide boss 270 positioned above the pick blade 230B for limiting upward range of motion of the pick blade 230B as the pick blade 230B moves away from a corresponding side of the guide cage 120 and the slide assembly 235 is centered, thereby preventing the pick blade 230B from interfering with a disc 110 moving into or out of the guide cage 120 while the slide assembly 235 is centered.

In one embodiment, the pivot bar 231 includes one or more pins 280. As shown in FIG. 5A, in one embodiment, the pivot bar 231 includes, for each pick blade 230B, a corresponding pin 280 positioned above and within proximity of a pivot end 230R of the pick blade 230B. When a pick blade 230B moves away from a corresponding side of the guide cage 120 to retract a tip 230T of the pick blade 230B into the vertical space 125, a corresponding pin 280 presses against a pivot end 230R of the pick blade 230B to limit droop of the tip 230T as the pick blade 230B moves inwards and clear of a corresponding roller cam guide 275.

FIG. 5B illustrates a cross-sectional close-up view of a portion of the disc selector mechanism 220 when the slide assembly is centered, in accordance with an embodiment of the invention. In one embodiment, each pick blade 230B is designed/shaped to control a path of a tip 230T of the pick blade 230B as a portion of the pick blade 230B translates in contact with a corresponding roller cam guide 275, such that the tip 230T follows a desired path to contact an edge 110E of a disc 110 and lift/push the disc 110 upwards into the disc gripper device 161 (FIGS. 6C-6E).

For example, in one embodiment, an underside 230U of each pick blade 230B is designed/shaped to engage with a corresponding roller cam guide 275. As shown in FIG. 5B, in one embodiment, an underside 230U of each pick blade 230B includes a curved portion 230P located within proximity of a tip 230T of the pick blade 230B. When the slide assembly 235 is centered, a curved portion 230P of each pick blade 230B rests on top of a corresponding roller cam guide 275 for the pick blade 230B. When a first pick blade 230B moves towards a corresponding side of the guide cage 120 to extend a tip 230T of the pick blade 230B out of the vertical space 125 and beyond the guide cage 120 (e.g. to the left), a corresponding roller cam guide 275 rolls along a portion of an underside 230U of the pick blade 230B in a first direction (e.g., counter-clockwise direction) to control a path of the tip 230T as the pick blade 230B moves outwards to a raised position. When a first pick blade 230B moves away from a corresponding side of the guide cage 120 (e.g. to the right) to retract a tip 230T of the pick blade 230B into the vertical space 125, a corresponding roller cam guide 275 rolls along a portion of an underside 230U of the pick blade 230B in a second direction (e.g., clockwise direction) opposite of the first direction to control a path of the tip 230T as the pick blade 230B moves inwards.

As shown in FIG. 5B, in one embodiment, a topside 230Q of each pick blade 230B is designed/shaped to engage with a corresponding guide boss 270. When the slide assembly 235 is centered, a corresponding guide boss 270 for a pick blade 230B presses/pushes a topside 230Q of the pick blade 230B down to assure that pick blade 230B pivots downward as the slide assembly 235 moves back to its centered position, thereby preventing the pick blade 230B from interfering with a disc 110 moving into or out of the guide cage 120 when the slide assembly 235 is centered.

As shown in FIG. 5B, in one embodiment, a pivot end 230R of each pick blade 230B is designed/shaped to engage with a corresponding pin 280. When a pick blade 230B moves away from a corresponding side of the guide cage 120 to retract a tip 230T of the pick blade 230B into the vertical space 125, a corresponding pin 280 presses against a pivot end 230R of the pick blade 230B to limit droop of the tip 230T as the pick blade 230B moves inwards and clear of a corresponding roller cam guide 275.

Figure 6A:
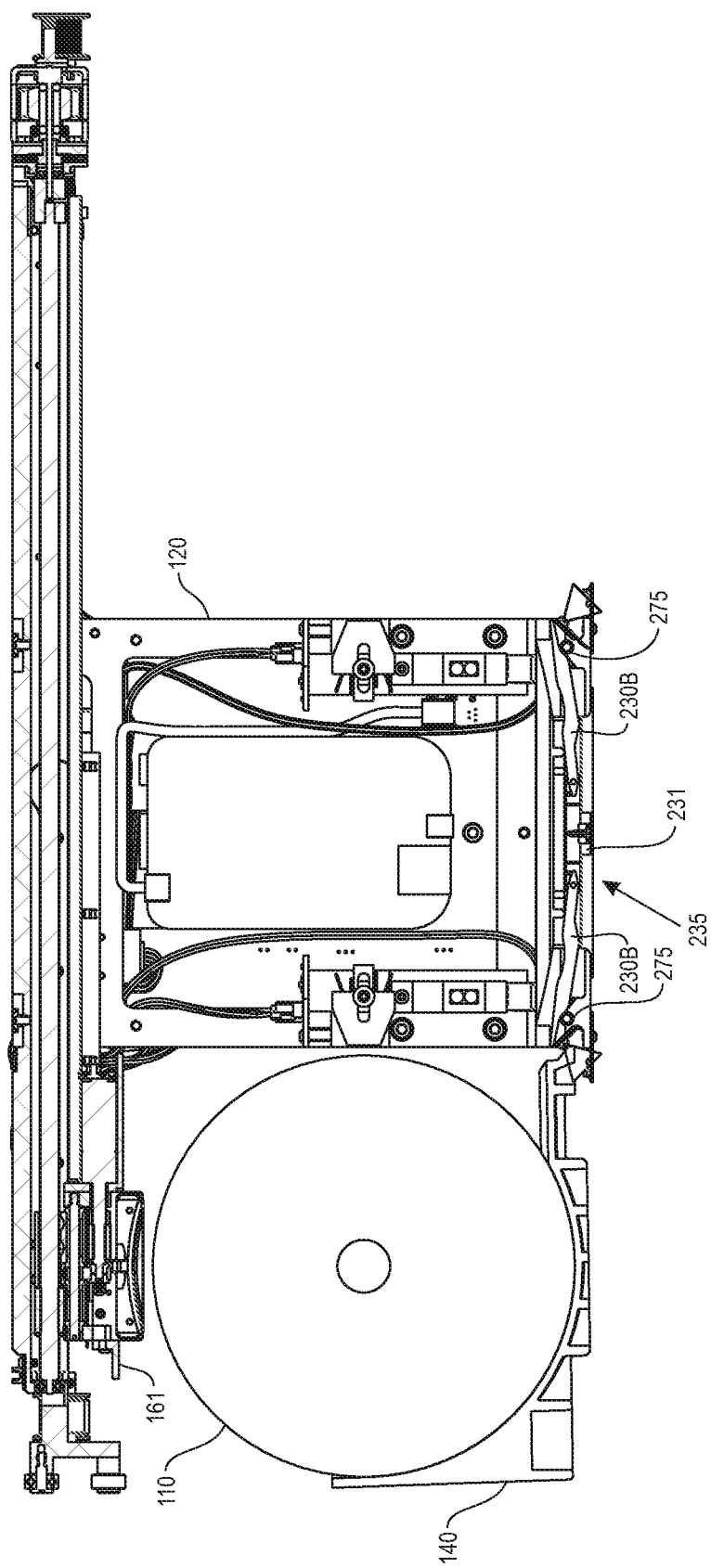
FIG. 6A illustrates a cross-sectional view of the DRU and the disc selector mechanism with the slide assembly centered, in accordance with an embodiment of the invention.
Figure 6B:
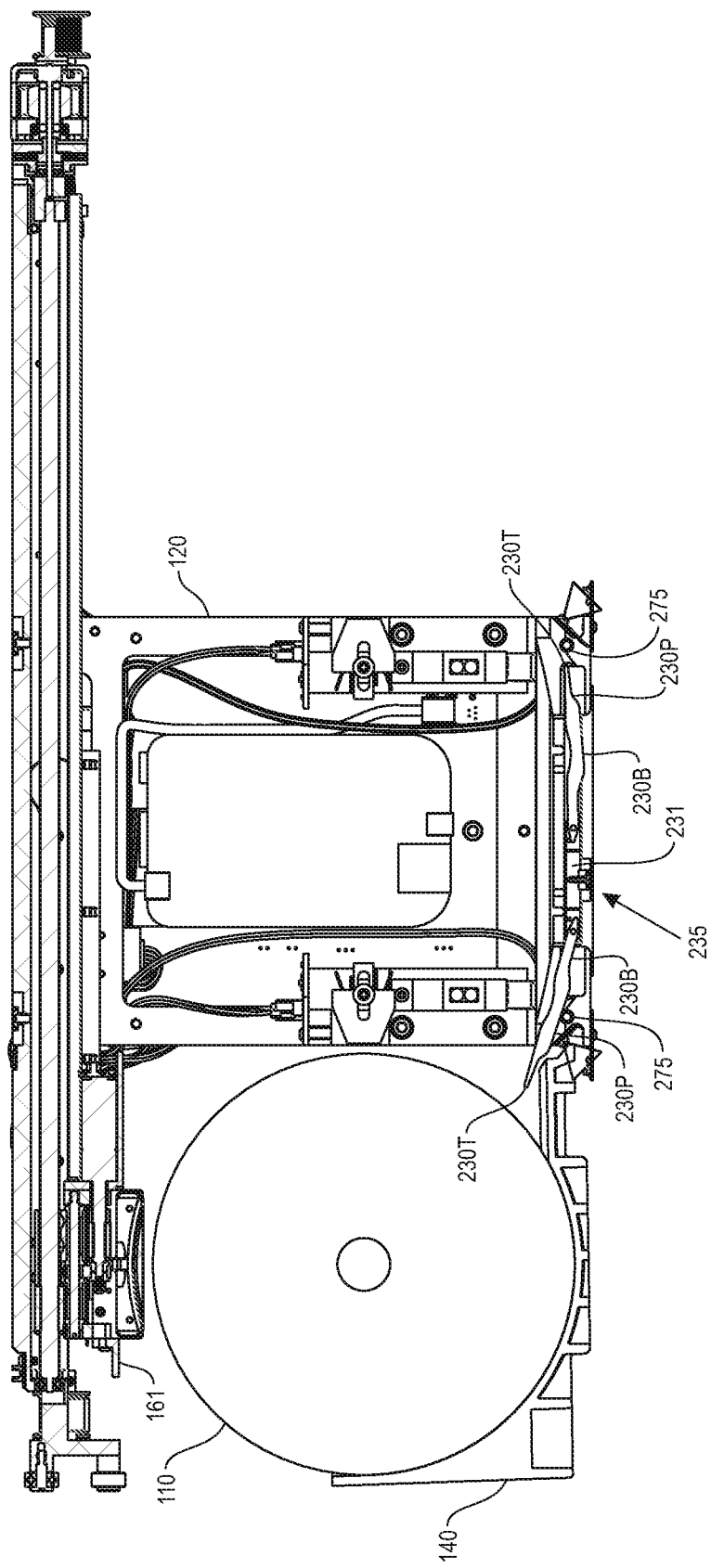
FIG. 6B illustrates a cross-sectional view of the DRU and the disc selector mechanism with the slide assembly translated outward, causing a first pick blade of the slide assembly to move outwards and to pivot to a raised position, in accordance with an embodiment of the invention.
Figure 6C:
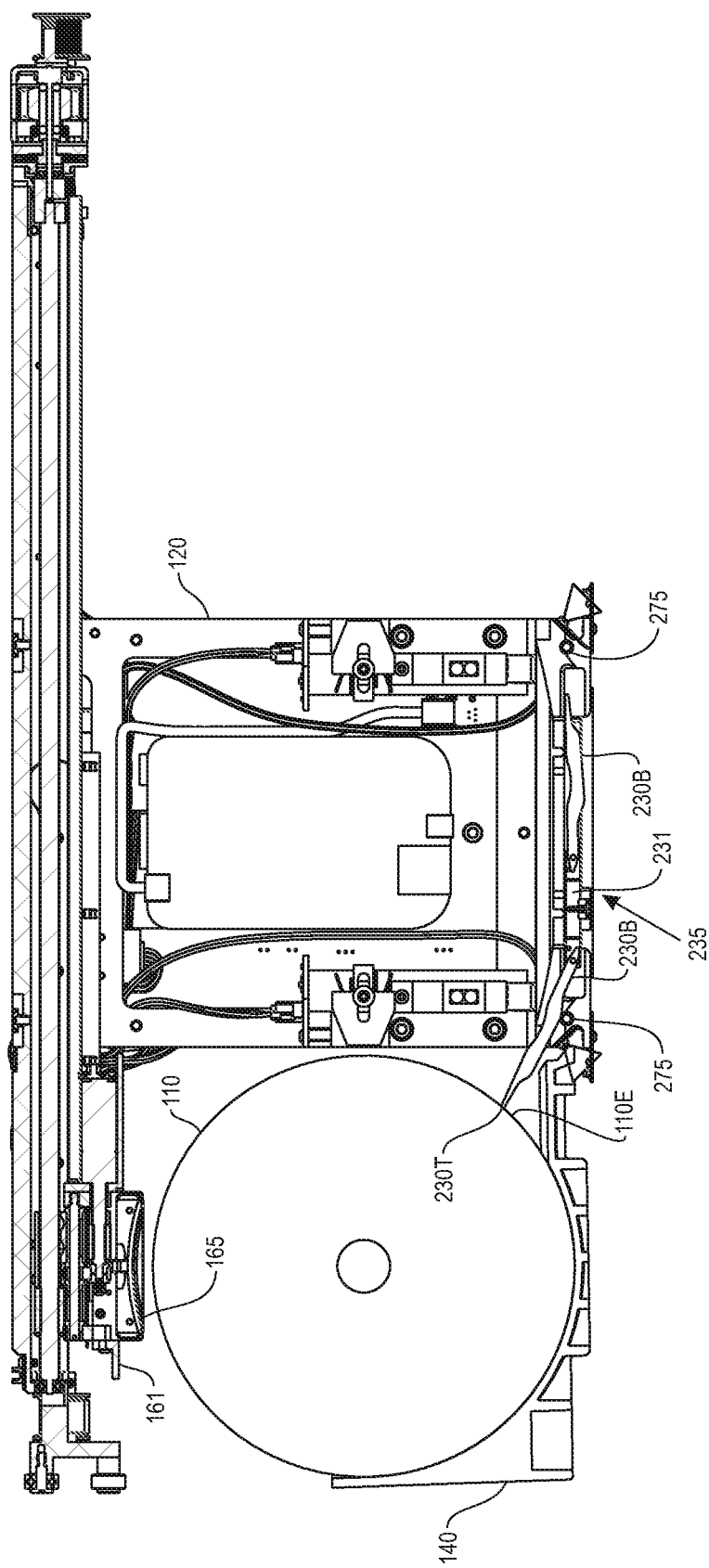
FIG. 6C illustrates a cross-sectional view of the DRU and the disc selector mechanism with the slide assembly translated further outward, causing the first pick blade to move further outward and to further pivot to contact an edge of a selected disc, in accordance with an embodiment of the invention.
Figure 6D:
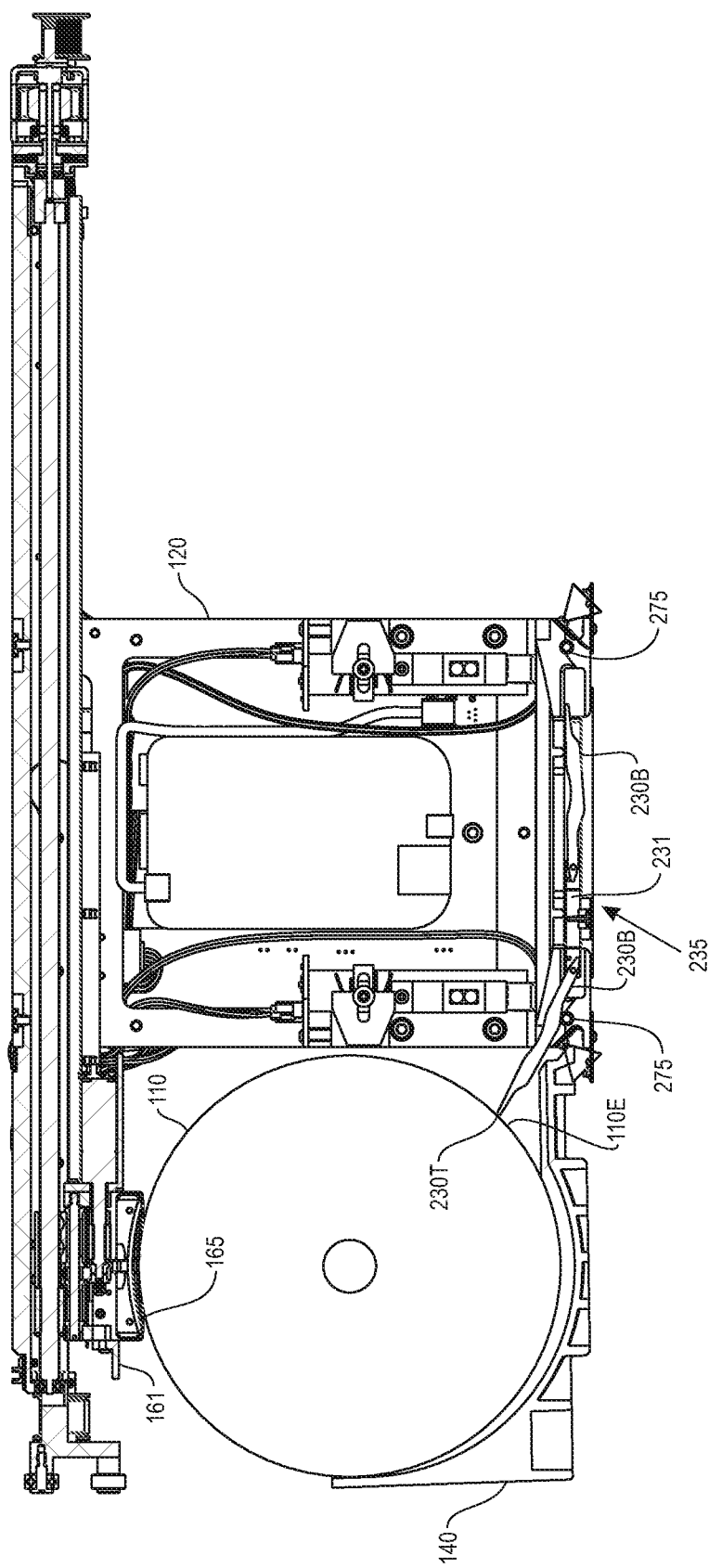
FIG. 6D illustrates a cross-sectional view of the DRU and the disc selector mechanism with the slide assembly translated further outward, causing the first pick blade to move further outward and to further pivot to a position where the first pick blade partially lifts the selected disc, in accordance with an embodiment of the invention.
Figure 6E:
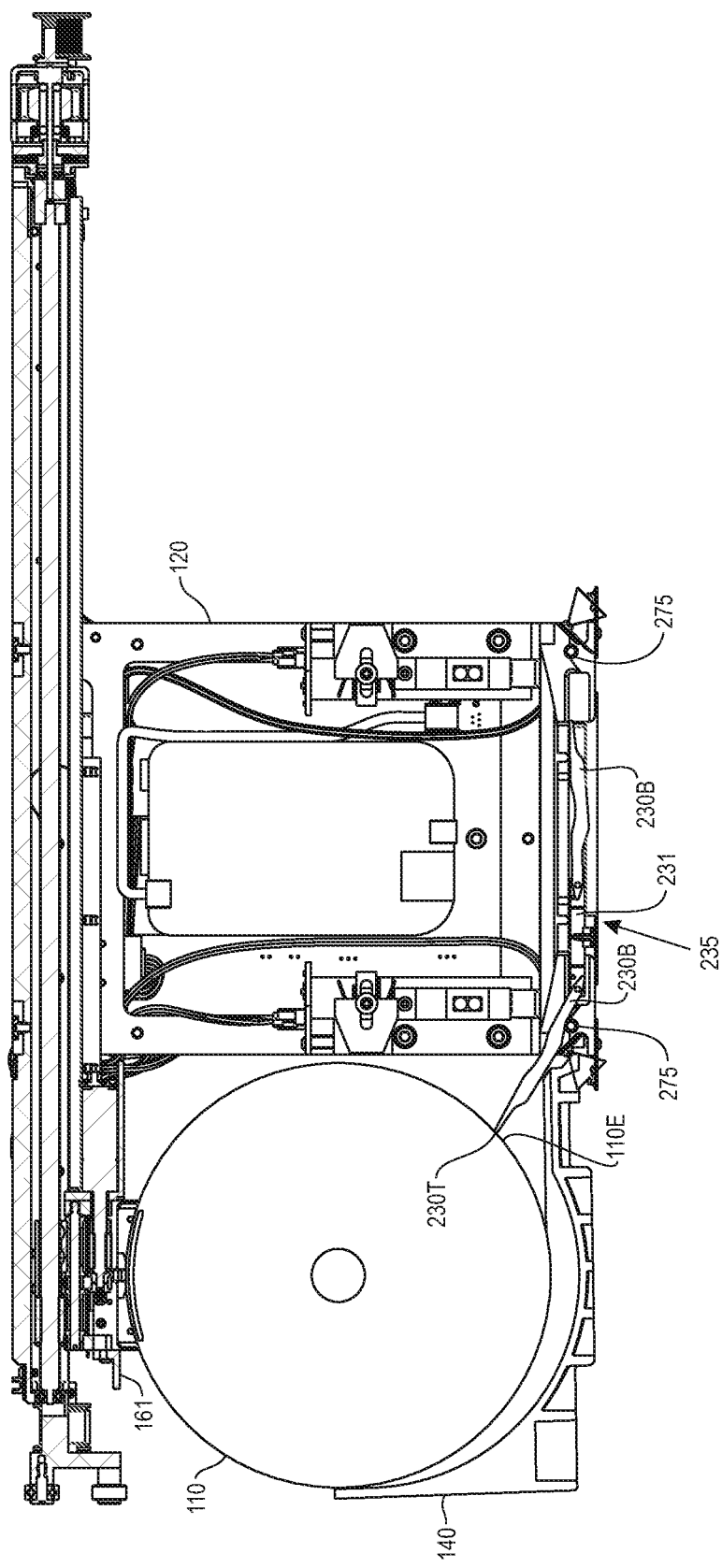
FIG. 6E illustrates a cross-sectional view of the DRU and the disc selector mechanism with the slide assembly translated further outward to a position where the first pick blade fully lifts the selected disc into a disc gripper device, in accordance with an embodiment of the invention.

FIGS. 6A-6E show cross-sectional views of the DRU 115 and the disc selector mechanism 220, illustrating a sequence of configurations of the slide assembly 235 as a pick blade 230B selects a disc 110 and lifts/pushes the selected disc 110 upwards into the disc gripper device 161, in accordance with an embodiment of the invention. FIG. 6A illustrates a centered position of the slide assembly 235, in accordance with an embodiment of the invention. As shown in FIG. 6A, the disc gripper device 161 is moved to a first side (e.g., left side) of the guide cage 120 and positioned above a disc 110 in a disc cassette 140 located on the first side. As further shown in FIG. 6A, when the slide assembly 235 is centered, a center of the pivot bar 231 is positioned to substantially align with the guide cage center C, each pick blade 230B rests on top of a corresponding roller cam guide 275, and each tip 230T of each pick blade 230B is maintained within the vertical space 125 and does not extend beyond the guide cage 120.

FIG. 6B illustrates a configuration of the slide assembly 235 where the slide assembly 235 is translated outward in response to moving the slide 240 along the shaft 261 towards the first side (e.g., left side) of the guide cage 120, in accordance with an embodiment. This movement drives a first pick blade 230B corresponding to the first side to move towards the first side of guide cage 120 and simultaneously pivot so as to raise its tip 230T (i.e., tip 230T of the first pick blade 230B). Specifically, as shown in FIG. 6B, the pivot bar 231 moves away from the guide cage center C and towards the first side in a straight line, which in turn causes a first pick blade 230B corresponding to the first side to move towards the first side and a second pick blade 230B opposite of the first pick blade 230B to move away from a second side (e.g., right side) of the guide cage 120. The linear motion of the pivot bar 231 causes a corresponding roller cam guide 275 for the first pick blade 230B to roll along an underside 230U of the first pick blade 230B in a first direction (e.g., counter-clockwise direction), resulting in the first pick blade 230B moving outwards and pivoting to extend and raise its tip 230T out of the vertical space 125 and beyond the guide cage 120.

At the same time, the linear motion of the pivot bar 231 causes a corresponding roller cam guide 275 for the second pick blade 230B to roll along an underside 230U of the second pick blade 230B in the same direction (e.g., counter-clockwise direction) as the first direction, resulting in the second pick blade 230B moving inwards and eventually clearing the roller cam guide 275 to retract its tip 230T (i.e., tip 230T of the second pick blade 230B) further into the vertical space 125. The downward rotation of the second pick blade 230B when it is clear of roller cam guide 275 is limited by a pin 280.

FIG. 6C illustrates a configuration of the slide assembly 235 where the slide assembly 235 is translated further outward, causing the first pick blade 230B to move further outward and to further pivot to contact an edge 110E of a selected disc 110, in accordance with an embodiment of the invention. As shown in FIG. 6C, the tip 230T of the first pick blade 230B contacts the edge 110E of the disc 110 in a disc cassette 140, thereby selecting the disc 110.

FIG. 6D illustrates a configuration of the slide assembly 235 when the slide assembly 235 is translated further outward, causing the first pick blade 230B to move further outward and to further pivot to a position where the first pick blade partially lifts the selected disc 110, in accordance with an embodiment of the invention. As shown in FIG. 6D, the tip 230T of the first pick blade 230B lifts/pushes the disc 110 upwards towards the disc gripper device 161.

FIG. 6E illustrates a configuration of the slide assembly 235 where the slide assembly 235 is translated further outward to a position where the first pick blade 230B fully lifts the selected disc 110 into the disc gripper device 161, in accordance with an embodiment of the invention. As shown in FIG. 6E, the tip 230T of the first pick blade 230B lifts/pushes the disc 110 upwards into the disc gripper device 161. In one embodiment, the first pick blade 230B lifts/pushes the disc 110 upwards into one or more jaws 165 of the disc gripper device 161.

FIG. 7 illustrates an example limiting position of a tip 230T of a pick blade 230B relative to a position of a disc 110 fully in the disc gripper device 161, in accordance with an embodiment. As shown in FIG. 7, the limiting position extends beyond a position required to lift the disc 110 fully into the disc gripper device 161. A limited amount of over-travel is desirable so the tip 230T can push a disc 110 fully into the one or more jaws 165 of the disc gripper device 161 without interference from any other mechanical limitation.

Figure 8:
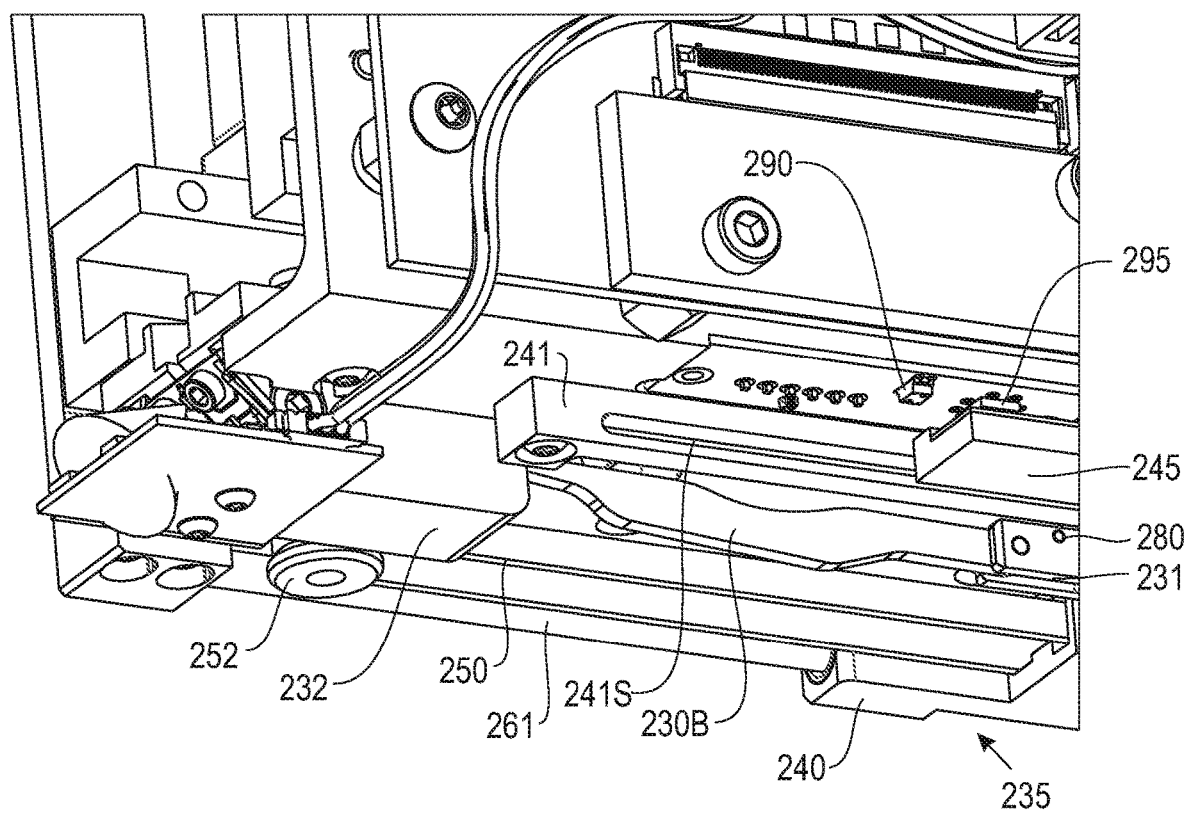
FIG. 8 illustrates a bottom perspective close-up view of a portion of the disc selector mechanism, in accordance with an embodiment of the invention.

FIG. 8 illustrates a bottom perspective close-up view of a portion of the disc selector mechanism 220, in accordance with an embodiment of the invention. In one embodiment, the disc selector mechanism 220 comprises one or more sensors configured for providing high-resolution information on a position of the slide 240. The high-resolution information can be used for controlling the disc selector drive motor 210 to quickly and accurately move a selected disc 110 without damaging the selected disc or any neighboring discs. For example, in one embodiment, the disc selector mechanism 220 comprises a reflective photo interrupter 290 configured for detecting (i.e., sensing) a position of the slide 240 on the shaft 261 relative to the guide cage center C. For example, in one embodiment, the photo interrupter 290 is positioned on the bottom 120B, such that the shelf 245 is within proximity of and below the photo interrupter 290 as the slide 240 slides along the shaft 261. The photo interrupter 290 is configured to read a code strip on the shelf 245 to detect whether the slide 240 is positioned at about the guide cage center C, to the first side (e.g., left side) of the guide cage center C, or to the second side (e.g., right side) of the guide cage center C.

In one embodiment, the disc selector mechanism 220 comprises a high-resolution encoder 295 configured for detecting and measuring direction of movement of the slide 240, and generating information (e.g., 1176 counts/in) indicative of an absolute or relative position of the slide 240 on the shaft 261. For example, in one embodiment, the encoder 295 is positioned on the bottom 120B, such that the shelf 245 is within proximity of and below the encoder 295 as the slide 240 slides along the shaft 261. The encoder 295 is configured to read a code strip on the shelf 245 to detect and measure direction and extent of movement of the slide 240.

Figure 9A:
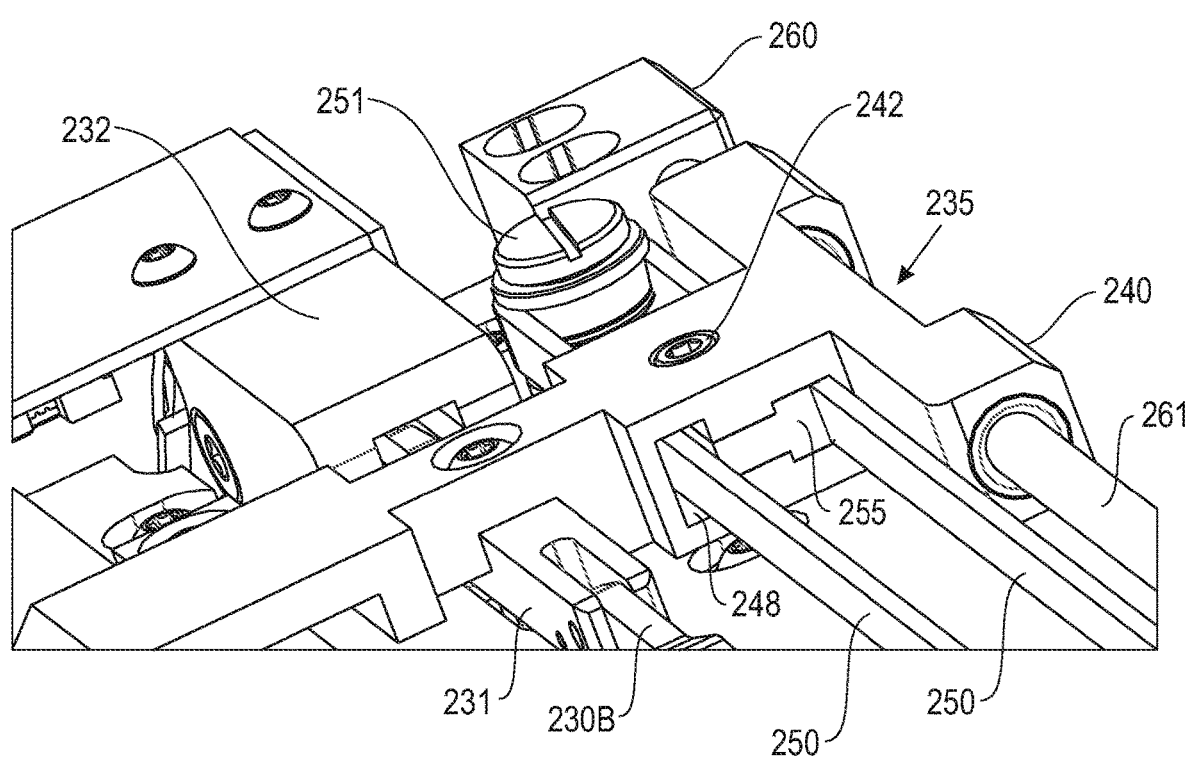
FIG. 9A illustrates a bottom perspective view of a portion of the slide assembly, in accordance with an embodiment of the invention.

FIG. 9A illustrates a bottom perspective view of a portion of the slide assembly 235, in accordance with an embodiment of the invention. As shown in FIG. 9A, in one embodiment, the slide 240 includes an opening (i.e., a slot) 248 (FIG. 4D) designed/shaped for receiving the timing belt 250 and a timing belt locking component 255. The timing belt 250 is passed through the opening 248. The locking component 255 is maintained inside the opening 248 and positioned in between the timing belt 250. The locking component 255 is designed/shaped to engage with and lock a portion of the timing belt 250 in place. The portion of the timing belt 250 that is locked in place allows for the slide 240 to engage and maintain proximate contact with the shaft 261 as the slide 240 slides along the shaft 261. In one embodiment, a connector 242 (e.g., a screw or another type of fastener or connection mechanism) is used to secure the locking component 255 inside the opening 248.

Figure 9B:
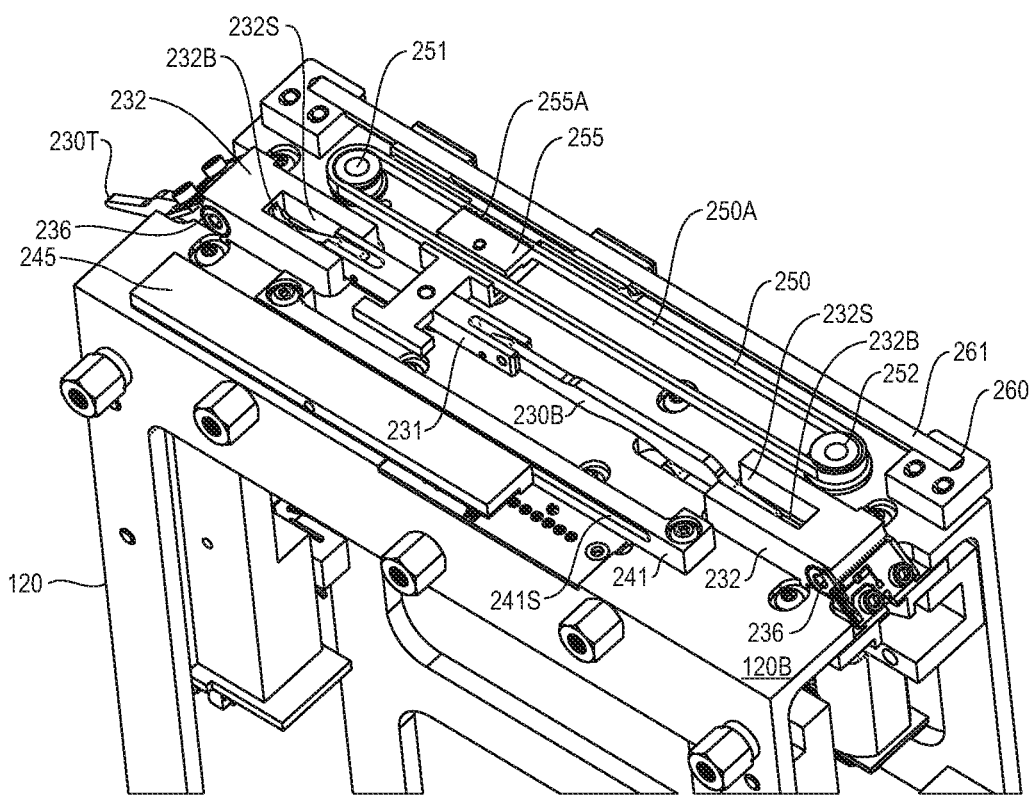
FIG. 9B illustrates a cross-sectional view of the timing belt locking component with a portion of a slide of the slide assembly removed for ease of illustration, in accordance with an embodiment of the invention.

FIG. 9B illustrates a cross-sectional view of the locking component 255 with a portion of the slide 240 removed for ease of illustration, in accordance with an embodiment of the invention. In one embodiment, the locking component 255 includes a toothed portion 255A designed/shaped to engage with and lock a side 250A of the timing belt 250 in place.

The locking component 255 allows the timing belt 250 to drive the slide 240 close to the shaft 261. As shown in FIG. 9B, the disc selector mechanism 220 further comprises one or more shoulder screws 236 that fasten to the one or more guides 232 and serve as axles for the one or more roller cam guides 275.

Figure 10:
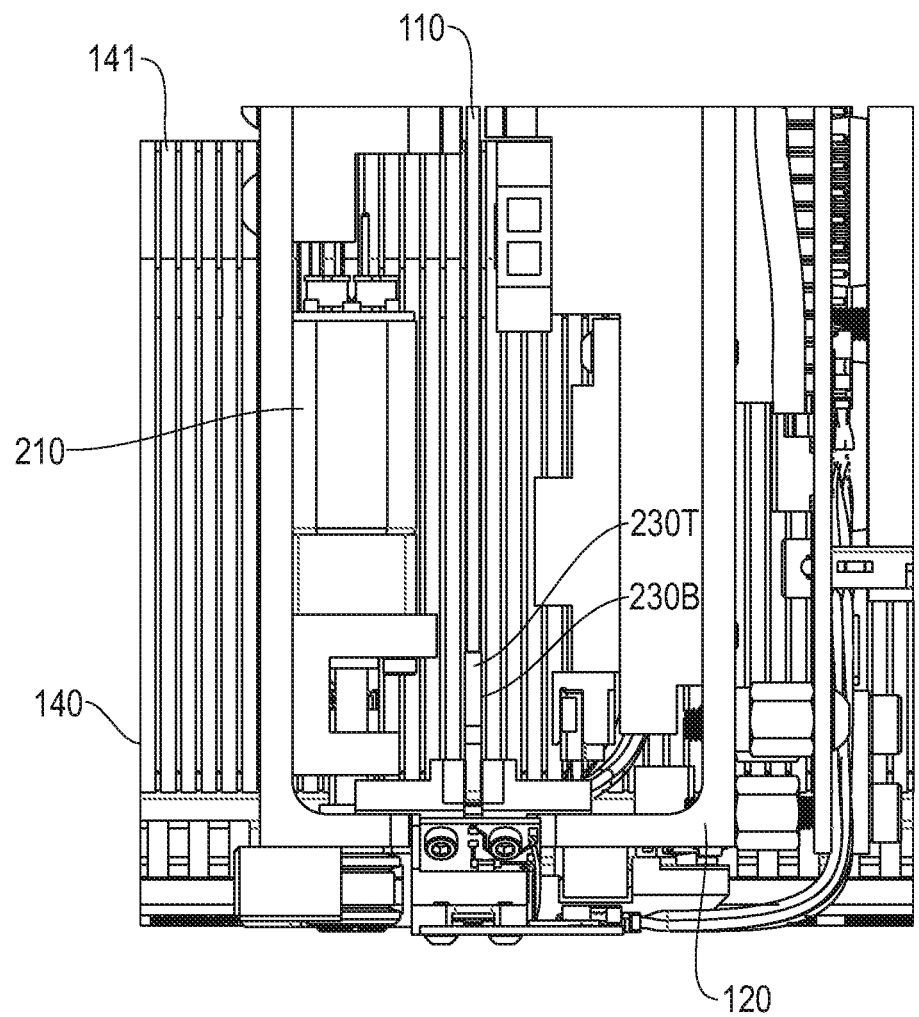
FIG. 10 illustrates a side view, looking through the guide cage, showing a pick blade of the slide assembly in a raised position to select and lift/push a disc, in accordance with an embodiment of the invention.

FIG. 10 illustrates a side view, looking through the guide cage 120, showing a pick blade 230B in a raised position to select and lift/push a disc 110, in accordance with an embodiment of the invention. As shown in FIG. 10, when a pick blade 230B is raised to select and lift/push a disc 110 from a disc cassette 140 upwards into a disc gripper device 161, a tip 230T of the pick blade 230B is aligned with the disc 110 and a cassette slot 141 of the disc cassette 140 that holds the disc 110 in place.

Figure 11:
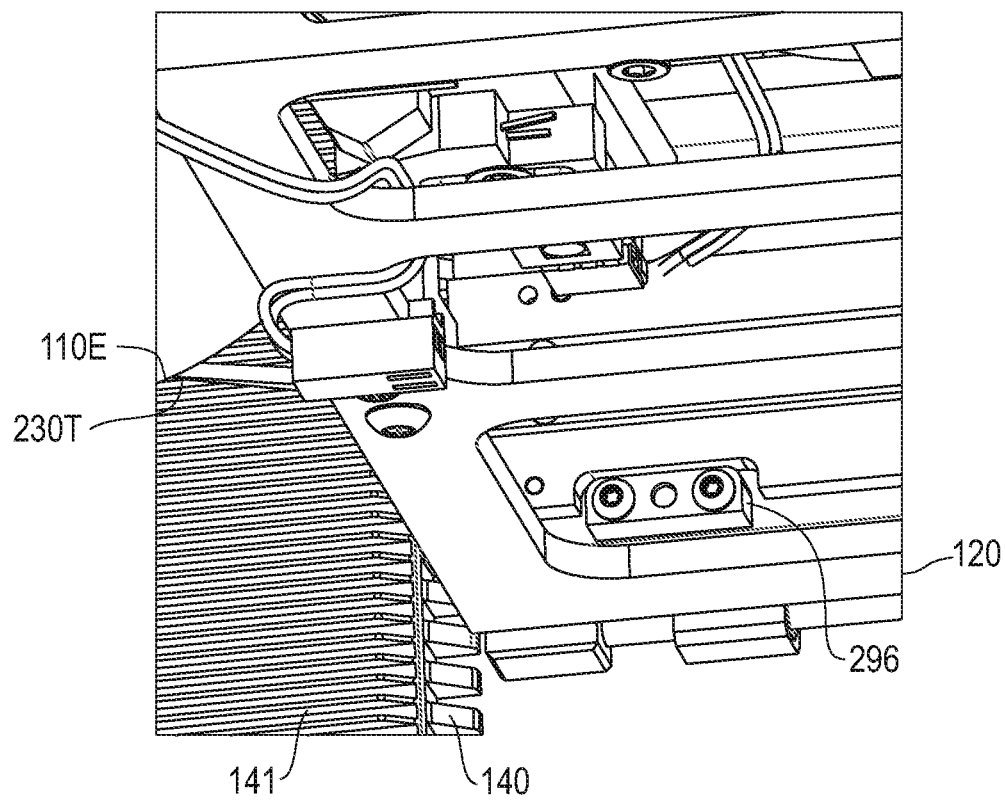
FIG. 11 illustrates a top and perspective view of a pick blade of the slide assembly in a raised position with a tip of the pick blade aligned with and contacting an edge of a disc to select and lift/push the disc from a disc cassette upwards into the disc gripper device, in accordance with an embodiment of the invention.

FIG. 11 illustrates a top and perspective view of a pick blade 230B in the raised position with a tip 230T of the pick blade 230B aligned with and contacting an edge 110E of a disc 110 to select and lift/push the disc 110 from a disc cassette 140 upwards into the disc gripper device 161, in accordance with an embodiment of the invention. In one embodiment, the idler pulley 251 has a corresponding idler pulley mount (i.e., mounting block) 296 for mounting the idler pulley 251 to the bottom 120B (FIG. 4A) of the guide cage 120. A position of the idler pulley mount 296 is adjustable to appropriately tension the timing belt 250. Adjusting a position of the idler pulley mount 296 causes an adjustment to a position of the idler pulley 251 relative to the timing belt 250, which in turn adjusts a tension of the timing belt 250. For example, positioning the idler pulley 251 to a position further away from the guide cage center C causes the timing belt 250 to tighten. As another example, positioning the idler pulley 251 to a position closer to the guide cage center C causes the timing belt 250 to loosen.

Unlike the prior art disc selector system 30 in FIG. 2, the disc selector mechanism 220 has low friction, no backlash, takes up less vertical space below the guide cage 120, and ensures minimal play of a pick blade 230B in any direction, so that a path of a tip 230T of each pick blade 230B can be accurately sensed and controlled. As the disc selector mechanism 220 is vertically compact, any additional or extra vertical space not used for the disc selector mechanism 220 helps with manufacturability of the optical disc library 100.

FIG. 12 is a flowchart for an example process 700 for selecting and moving a single disc in an optical disc library, in accordance with an embodiment of the invention. Process block 701 includes moving a disc gripper device (e.g., disc gripper device 161) to a side of a guide cage (e.g., guide cage 120) until the disc gripper device is positioned above a disc cassette (e.g., disc cassette 140) positioned on the same side of the guide cage. Process block 702 includes using one or more motor-driven transmission components (e.g., timing belt 250 and timing belt pulley 252) to drive a linear translation of a pivot bar (e.g., pivot bar 231) coupled to a pick blade (e.g., pick blade 230B) maintained in a space (e.g., vertical space 125) below the guide cage, wherein the linear translation causes the pick blade to move towards the same side of the guide cage. Process block 703 includes rolling a portion (e.g., underside 230U) of the pick blade on top of a roller cam guide (e.g., roller cam guide 275) to control a path of a tip (e.g., tip 230T) of the pick blade as the pick blade moves out of the space and pivots to a raised position. Process block 704 includes making contact with an edge (e.g., edge 110E) of a disc (e.g., disc 110) in the disc cassette via the tip when the pick blade is in the raised position. Process block 705 includes lifting the disc from the disc cassette upwards into the disc gripper device via the tip when the pick blade is in the raised position.

In one embodiment, process blocks 701-705 are performed by one or more components of the disc selector system 130, such as the disc selector mechanism 220 and the disc selector drive motor 210.

Figure 13:
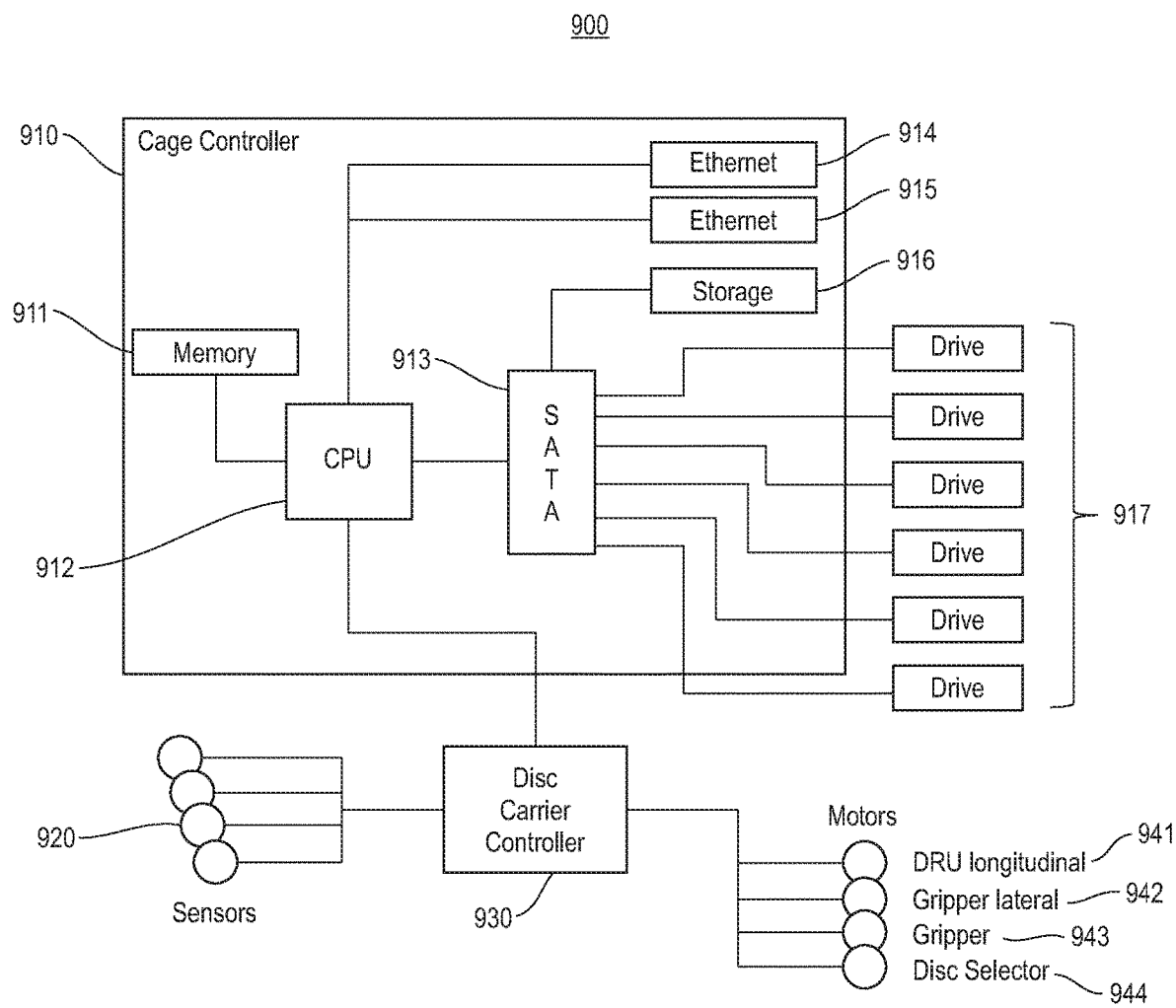
FIG. 13 shows example control circuitry and electronics for the DRU, in accordance with an embodiment of the invention.

FIG. 13 shows example control circuitry and electronics 900 for the DRU 115 in FIG. 3, in accordance with an embodiment of the invention. In one embodiment, the control circuitry and electronics 900 is implemented for the DRU 115. In one embodiment, optical sensors of a sensor set 920 are used in the DRU 115 to provide contactless position information for various moving components. In one example, optical sensors of the sensor set 920 of the DRU 115 combined with the features of the disc cassettes 140 and the optical disc drives 135 allow the disc gripper device 161 to be positioned to within +−0.1 mm. Other sensors of the sensor set 920 are used to sense the location of a slide assembly 235 of the DRU 115, whether a disc 110 is in the disc gripper device 161, the lateral position of the disc gripper device 161, etc. Sensors of the sensor set 920 may be used in concert with features on the disc cassettes 140 to facilitate positioning of the DRU 115 at disc locations. Other examples include referring to the discs 110 themselves. Similarly, features may be disposed on the guide cage 120 or the optical disc drives 135 to facilitate accurate positioning of the DRU 115 when loading and unloading discs 110 from the optical disc drives 135. In another example, transmissive photo-interrupter sensors may be utilized for position state sensing of the various components. The motors used in the DRU 115 may be of the brushless DC type, optionally with shaft encoders to aid in position determination. In one example, the motors may include the DRU 115 longitudinal motor(s) 941, the disc gripper device 161 lateral motor(s) 942, the disc gripper device 161 motor 943, the disc selector drive motor(s) 944, etc.

In one embodiment, the control electronics shown in the control circuitry and electronics 900 are partitioned into a robotic controller (disc carrier controller 930) on a disc carrier and a cage controller 910 otherwise mounted in the optical disc library 100. The latter does not move, and includes a CPU 912, memory 911 and associated components for running the control software. In one example the control circuitry and electronics 900 includes local storage for holding an operating system and control software, although in another example may instead boot over a network and load necessary software, or even boot off the optical media of a disc 110. In another example, flash memory storage is implemented. The cage controller 910 includes both the external interface to a host system or network as well as interfaces (SATA 913, storage interface 916) to the optical disc drives 135, collectively shown as a set 917. In one example, the external interface may include a network interface, such as Ethernet. In one embodiment, for enhanced reliability, the network interface would include two connections, such as Ethernet connections 914 and 915 with each directed to a separate switch. In another example, a third external interface might be used for system control and monitoring.

In one embodiment, the cage controller 910 is responsive to commands over the external interface to load a disc 110, read and write data, and perform other operations. In one example, the cage controller 910 communicates with the robotic controller (disc carrier controller 930) to send commands, such as to load a selected disc 110 in a selected optical disc drive 135. The cage controller 910 also includes a data buffer for holding read and write data during data transfers.

In one embodiment, the robotic controller (disc carrier controller 930) manages the robotic activities of the DRU 115, including controlling the motors, reading optical and other sensor data and communicating state information with the cage controller 910. In one embodiment, the robotic controller (disc carrier controller 930) communicates with the cage controller 910 over a serial interface. The interface may be wired, such as universal serial bus (USB) over a flex cable, or wireless, such as infrared data association (IRDA), BLUETOOTH etc. In one example, on initialization, it is critical for the disc carrier controller 930 to determine the physical state of DRU 115 to prevent damage. If the DRU 115 has undergone a controlled shutdown, this state information may be recorded within the library. Even so, this shutdown state needs to be confirmed. The DRU 115 may have been powered down in an unknown state, such as by an unintended power loss. For example, before the DRU 115 can move longitudinally, the DRU 115 must determine if a disc 110 is in the disc gripper device 161 and if so, position the disc gripper device 161 within the drive carrier prior to a longitudinal move. In one embodiment, the sensors set 920 includes sensors to detect if the disc gripper device 161 is centered, or to the left or right of center. Thus, the disc gripper device 161 can be moved directly to the center position. Similarly, sensors of the sensor set 920 are provided to determine if the slide assembly 235 is centered, or to the left or right of center. Once both disc gripper device 161 and slide assembly 235 are centered, the DRU 115 may be moved longitudinally. All these functions are accomplished through means of the set of sensors 920. In one embodiment, optical sensors are used to make the position determinations.

In one embodiment, the DRU 115 determines if discs 110 are located within any of the optical disc drives 135. The optical disc drives 135 may be queried to see if a disc 110 is loaded and spindle of an optical disc drive 135 clamped. It is possible for a disc 110 to remain in an optical disc drive 135 but not be clamped by the spindle. This can be tested by attempting a clamp operation.

In one embodiment, an inventory manger is implemented that includes metadata for each disc 110 in the DRU 115. In one example, the metadata may include the media type, bad block table or other initialization information, location of the disc 110 within the guide cage 120, etc. The DRU 115 can transmit this initialization information to an optical disc drive 135 upon the load operation, which substantially shortens the startup time. The inventory manager also queries the optical disc drive 135 on unload to obtain updates to the media.

In one example, metadata, such as changes in the bad block information, is stored by the inventory manager in nonvolatile storage which may be external to the DRU 115. Any system metadata can be periodically flushed to specific locations on the media in the library to create self-described system state, such as for relocating a system. Alternatively, the metadata may be stored on other nonvolatile media in the cage controller 910.

In one embodiment, the DRU 115 software includes a library executive, which is responsive to read, write, mount and dismount commands from a host system. The library executive forwards mount and dismount commands and information to the disc carrier controller 930. The mount command information includes the disc location in the disc cassette 140 to select and the optical disc drive 135 to load.

The dismount command information includes information on the optical disc drive 135 to unload and the target location for storing the disc 110 in the disc cassette 140.

As will be appreciated by one skilled in the art, aspects of the embodiments may be a system, a method, and/or a computer program product at any possible technical detail level of integration. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

Aspects of the embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles of the embodiments and the practical application, and to enable others of ordinary skill in the art to understand the various embodiments with various modifications as are suited to the particular use contemplated.

What is claimed is:

1. A disc selector system comprising:
a motor; and
a disc selector mechanism coupled to a bottom of a guide cage and maintained in a space below the guide cage, wherein the disc selector mechanism comprises:
a shaft;
a slide laterally slidable along the shaft in response to the motor driving the slide;
a pivot bar coupled to the slide; and
a pick blade pivotally coupled to the pivot bar;
wherein a linear motion of the slide along the shaft drives a linear translation of the pivot bar, and the linear translation drives the pick blade to move out of the space and pivot to a raised position to contact and lift a disc upwards into a disc gripper device.

2. The disc selector system of claim 1, wherein the disc selector mechanism further comprises:
a roller cam guide positioned below the pick blade for controlling a path of a tip of the pick blade as the pick blade moves out of the space and pivots to the raised position.

3. The disc selector system of claim 2, wherein an underside of the pick blade is shaped to engage and translate in contact with the roller cam guide to guide the tip of the pick blade to contact an edge of the disc and lift the disc upwards into the disc gripper device.

4. The disc selector system of claim 2, wherein the disc selector mechanism further comprises:
a pin positioned above and within proximity of a pivot end of the pick blade that is opposite of the tip of the pick blade, wherein the pin presses against the pivot end to limit droop of the tip as the pick blade retracts from the raised position and moves into the space and the tip is clear of the roller cam guide.

5. The disc selector system of claim 1, wherein the disc selector mechanism further comprises:
a guide boss positioned above the pick blade for limiting upward range of motion of the pick blade as the pick blade retracts from the raised position into the space and a center of the pivot bar is substantially aligned with a center of the guide cage.

6. The disc selector system of claim 5, wherein the guide boss pushes down on a topside of the pick blade to prevent the pick blade from interfering with any disc moving into or out of the guide cage when the center of the pivot bar is substantially aligned with the center of the guide cage.

7. The disc selector system of claim 1, wherein the disc selector mechanism further comprises:
a first slot shaped for receiving a portion of the pivot bar; and
a second slot shaped for limiting a motion of the pick blade as the pick blade moves out of the space and pivots to the raised position or retracts from the raised position and moves into the space.

8. A method comprising:
moving a disc gripper device until the disc gripper device is positioned above a disc cassette positioned on a side of a guide cage; and
lifting a disc from the disc cassette upwards into the disc gripper device via a disc selector system comprising:
a motor; and
a disc selector mechanism coupled to a bottom of the guide cage and maintained in a space below the guide cage;
wherein the disc selector mechanism comprises a shaft, a slide laterally slidable along the shaft in response to the motor driving the slide, a pivot bar coupled to the slide, and a pick blade pivotally coupled to the pivot bar; and
wherein a linear motion of the slide along the shaft drives a linear translation of the pivot bar, and the linear translation drives the pick blade to move to out of the space and pivot to a raised position to contact and lift the disc upwards into a disc gripper device.

9. The method of claim 8, wherein the disc selector mechanism further comprises:
a roller cam guide positioned below the pick blade for controlling a path of a tip of the pick blade as the pick blade moves out of the space and pivots to the raised position.

10. The method of claim 9, wherein an underside of the pick blade is shaped to engage and translate in contact with the roller cam guide to guide the tip of the pick blade to contact an edge of the disc and lift the disc upwards into the disc gripper device.

11. The method of claim 9, wherein the disc selector mechanism further comprises:
a pin positioned above and within proximity of a pivot end of the pick blade that is opposite of the tip of the pick blade, wherein the pin presses against the pivot end to limit droop of the tip as the pick blade retracts from the raised position and moves into the space and the tip is clear of the roller cam guide.

12. The method of claim 8, wherein the disc selector mechanism further comprises:
a guide boss positioned above the pick blade for limiting upward range of motion of the pick blade as the pick blade retracts from the raised position into the space and a center of the pivot bar is substantially aligned with a center of the guide cage.

13. The method of claim 12, wherein the guide boss pushes down on a topside of the pick blade to prevent the pick blade from interfering with any disc moving into or out of the guide cage when the center of the pivot bar is substantially aligned with the center of the guide cage.

14. The method of claim 8, wherein the disc selector mechanism further comprises:
   a first slot shaped for receiving a portion of the pivot bar; and
   a second slot shaped for limiting a motion of the pick blade as the pick blade moves out of the space and pivots to the raised position or retracts from the raised position and moves into the space.

15. A computer program product comprising a computer readable storage medium having program code embodied therewith, the program code being executable by a computer to implement a method for selecting and moving a single disc in an optical disc library, the method comprising:
   moving a disc gripper device until the disc gripper device is positioned above a disc cassette positioned on a side of a guide cage; and
   lifting a disc from the disc cassette upwards into the disc gripper device via a disc selector system comprising:
      a motor; and
      a disc selector mechanism coupled to a bottom of the guide cage and maintained in a space below the guide cage;
      wherein the disc selector mechanism comprises a shaft, a slide laterally slidable along the shaft in response to the motor driving the slide, a pivot bar coupled to the slide, and a pick blade pivotally coupled to the pivot bar; and
      wherein a linear motion of the slide along the shaft drives a linear translation of the pivot bar, and the linear translation drives the pick blade to move to out of the space and pivot to a raised position to contact and lift the disc upwards into a disc gripper device.

16. The computer program product of claim 15, wherein the disc selector mechanism further comprises:
   a roller cam guide positioned below the pick blade for controlling a path of a tip of the pick blade as the pick blade moves out of the space and pivots to the raised position.

17. The computer program product of claim 16, wherein an underside of the pick blade is shaped to engage and translate in contact with the roller cam guide to guide the tip of the pick blade to contact an edge of the disc and lift the disc upwards into the disc gripper device.

18. The computer program product of claim 16, wherein the disc selector mechanism further comprises:
   a pin positioned above and within proximity of a pivot end of the pick blade that is opposite of the tip of the pick blade, wherein the pin presses against the pivot end to limit droop of the tip as the pick blade retracts from the raised position and moves into the space and the tip is clear of the roller cam guide.

19. The computer program product of claim 15, wherein the disc selector mechanism further comprises:
   a guide boss positioned above the pick blade for limiting upward range of motion of the pick blade as the pick blade retracts from the raised position into the space and a center of the pivot bar is substantially aligned with a center of the guide cage, wherein the guide boss pushes down on a topside of the pick blade to prevent the pick blade from interfering with any disc moving into or out of the guide cage when the center of the pivot bar is substantially aligned with the center of the guide cage.

20. The computer program product of claim 15, wherein the disc selector mechanism further comprises:
   a first slot shaped for receiving a portion of the pivot bar; and
   a second slot shaped for limiting a motion of the pick blade as the pick blade moves out of the space and pivots to the raised position or retracts from the raised position and moves into the space.

* * * * *